United States Patent
Yoo et al.

(10) Patent No.: US 11,245,933 B2
(45) Date of Patent: Feb. 8, 2022

(54) METHOD AND SERVER FOR GENERATING IMAGE DATA BY USING MULTIPLE CAMERAS

(71) Applicant: Samsung Electronics Co., Ltd., Gyeonggi-do (KR)

(72) Inventors: Eunkyung Yoo, Gyeonggi-do (KR); Jongwoo Jung, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/771,742

(22) PCT Filed: Jan. 15, 2019

(86) PCT No.: PCT/KR2019/000581
§ 371 (c)(1),
(2) Date: Jun. 11, 2020

(87) PCT Pub. No.: WO2019/143095
PCT Pub. Date: Jul. 25, 2019

(65) Prior Publication Data
US 2021/0076080 A1    Mar. 11, 2021

(30) Foreign Application Priority Data

Jan. 16, 2018 (KR) .................. 10-2018-0005757

(51) Int. Cl.
*H04N 21/218*     (2011.01)
*H04N 21/81*      (2011.01)
*H04N 21/422*     (2011.01)

(52) U.S. Cl.
CPC . *H04N 21/21805* (2013.01); *H04N 21/42203* (2013.01); *H04N 21/8126* (2013.01)

(58) Field of Classification Search
CPC ....... H04N 21/21805; H04N 21/42203; H04N 21/8126; H04N 21/23418;
(Continued)

(56) References Cited

U.S. PATENT DOCUMENTS 10,692,533 B2 *  6/2020  Paglia ................. G11B 27/031
10,699,747 B2 *  6/2020  Knutt .................... G11B 27/34
(Continued)

FOREIGN PATENT DOCUMENTS

KR    10-0960020 B1    5/2010
KR    10-1025899 B1    3/2011
(Continued)

*Primary Examiner* — Alazar Tilahun
(74) *Attorney, Agent, or Firm* — Cha & Reiter, LLC

(57) ABSTRACT

According to various embodiments of the present invention, a server may comprise: a communication circuit; and a processor electrically connected to the communication circuit, wherein the processor is configured to: receive image data of a first camera, selected as a main camera, among image data captured by multiple cameras through the communication circuit; transmit the received image data of the first camera to a real-time broadcast server through the communication circuit; and when a second camera among the multiple cameras satisfies a predesignated selection condition of a main camera, transmit image data of the second camera to the real-time broadcast server through the communication circuit. In addition, various other embodiments are possible.

15 Claims, 34 Drawing Sheets

(58) Field of Classification Search
CPC ......... H04N 21/47202; H04N 21/4854; H04N 21/2665; H04N 21/2668; H04N 21/2187; H04N 5/247; H04N 21/854
See application file for complete search history.

(56) References Cited

U.S. PATENT DOCUMENTS

| | | | |
|---|---|---|---|
| 2012/0304240 A1* | 11/2012 | Pereira | H04N 21/6581 |
| | | | 725/116 |
| 2012/0308209 A1* | 12/2012 | Zaletel | G11B 31/006 |
| | | | 386/278 |
| 2017/0150050 A1 | 5/2017 | Umeo | |
| 2017/0162230 A1 | 6/2017 | Maliuk et al. | |
| 2017/0163929 A1 | 6/2017 | Maliuk et al. | |
| 2017/0264920 A1* | 9/2017 | Mickelsen | H04N 21/4532 |
| 2018/0071610 A1* | 3/2018 | Miller | A63B 71/0622 |
| 2018/0343442 A1* | 11/2018 | Yoshikawa | G08B 13/19641 |

FOREIGN PATENT DOCUMENTS

| | | |
|---|---|---|
| KR | 10-2014-0097876 A | 8/2014 |
| KR | 10-1679318 B1 | 11/2016 |
| KR | 10-2017-0011862 A | 2/2017 |

\* cited by examiner

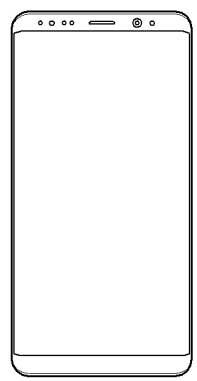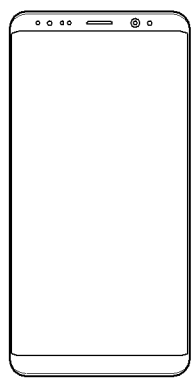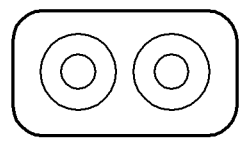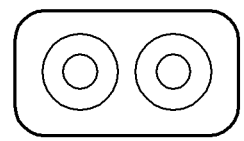
FIG.7B
FIG.7A
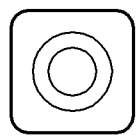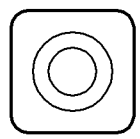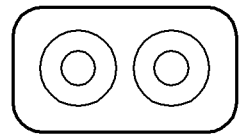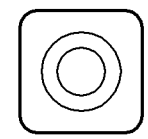
FIG.7C  FIG.7D
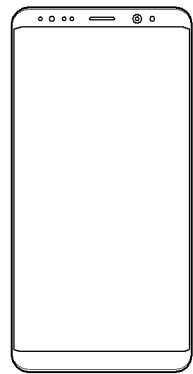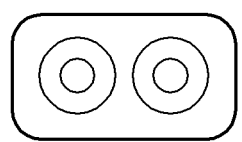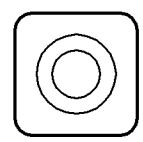
FIG.7E  FIG.7F

| State | State Image |
|---|---|
| Off | 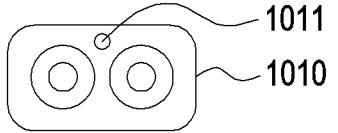 |
| Standby-Single | 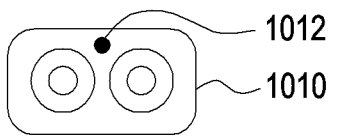 |
| Standby-Multi | 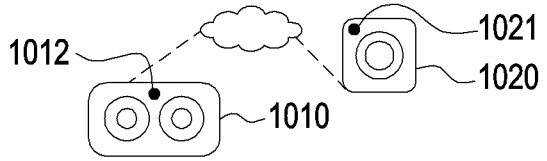 |
| Main Cam-Off | 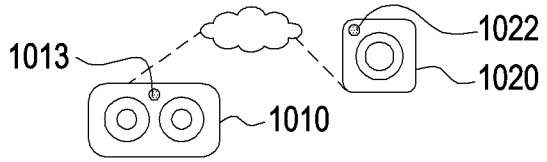 |
| Main Cam-On | 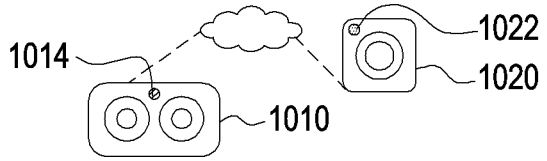 |
FIG.10

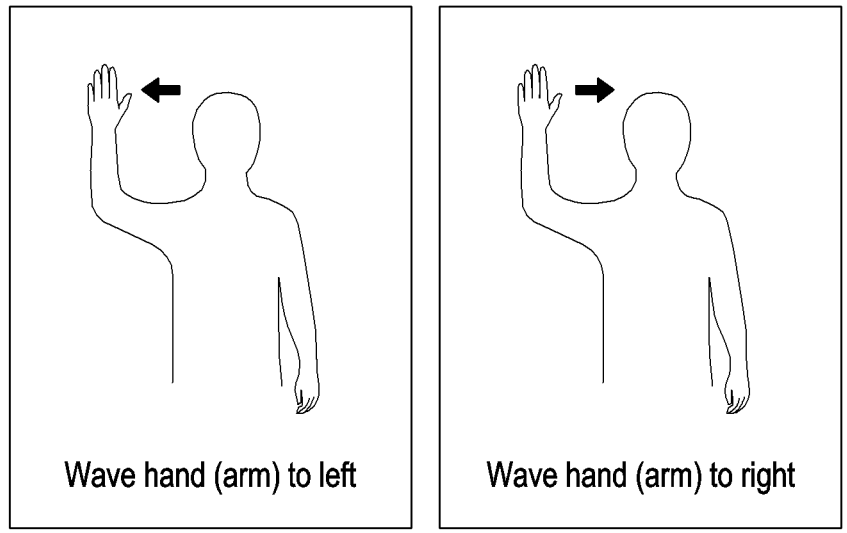
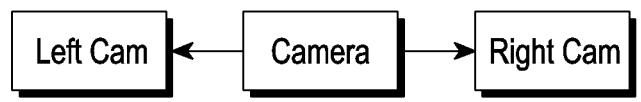
FIG.13A

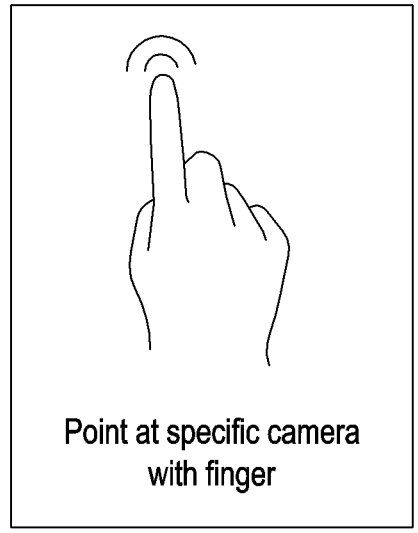
FIG.13B

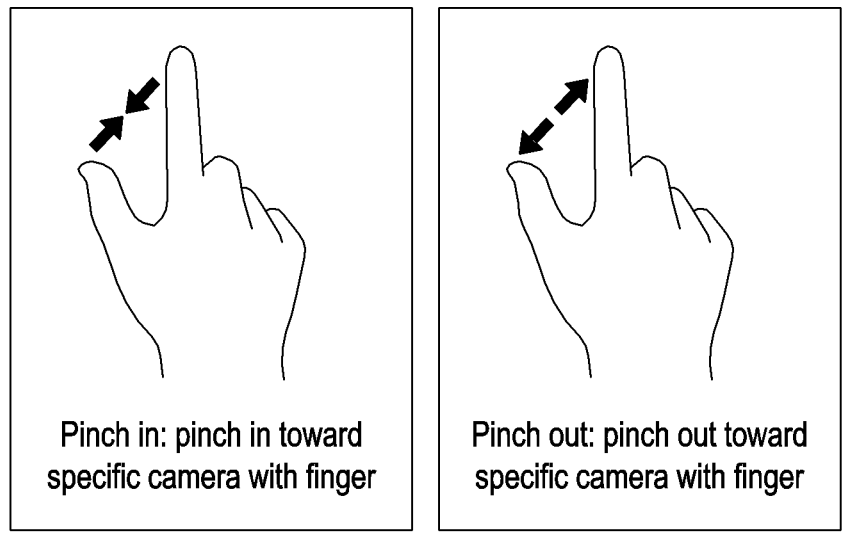
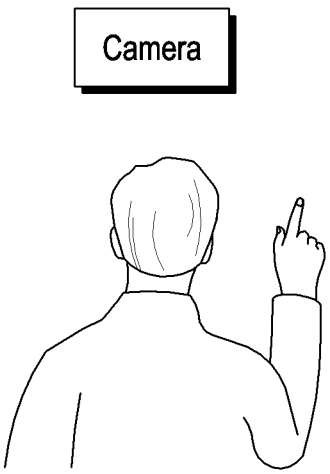
FIG.13C

[template configuration]
- user interaction: vision-based face recognition, camera motion recognition, voice recognition
- default composition of cam 1 (for example, fixed camera): close-up shot
- default composition of cam 2 (for example, hand-held camera): full shot

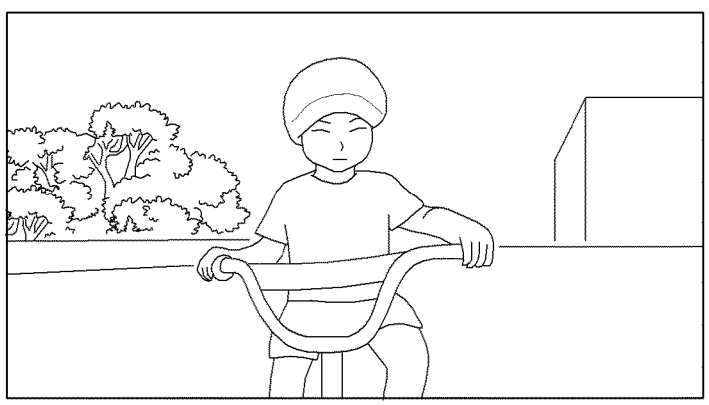

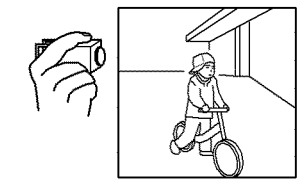

Camera 2 - take distance view while user holds camera 2

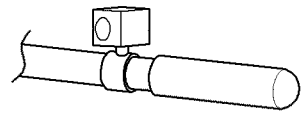

Camera 1 - take front face shot while camera 1 is fixed to handlebar

FIG.24

METHOD AND SERVER FOR GENERATING IMAGE DATA BY USING MULTIPLE CAMERAS

CROSS-REFERENCE TO RELATED APPLICATION(S)

This application is a National Phase Entry of PCT International Application No. PCT/KR2019/000581, which was filed on Jan. 15, 2019 and claims priority to Korean Patent Application No. 10-2018-0005757, which was filed on Jan. 16, 2018, the contents of which are incorporated herein by reference.

BACKGROUND

1. Field

The disclosure generally relates to a method and a server for generating image data through a plurality of cameras.

2. Description of the Related Art

In general, a multimedia device is a device having a function of receiving and processing a broadcast image which a user can view. The multimedia device may display, on a display, a broadcast selected by the user among broadcasting signals transmitted from a broadcasting station. Recently, the multimedia device may have an Operating System (OS) and an Internet browser to allow the user to freely view broadcasts, perform an Internet search, and download and execute a preferred application or content through an application store.

Due to the development of media devices, services by which general individuals create multimedia content and broadcast the multimedia content in real time through a real time broadcasting channel may increase. Further, as users' standards have increased, the trend of User Created Contents (UCC) has moved toward a desire for creating good content with simple control. That is, general users desire to generate and provide new content obtained through the application of various effects or a combination with other media rather than posting his/her own pictures or videos on a website as they really are.

SUMMARY

Due to the development of electronic devices and communication technology, real-time personal broadcasting services have increased, but it is not easy for an individual to control composition or location of a camera during a live broadcast. For example, when a user directly controls a camera during a real-time personal broadcast, an unnatural shooting result may be caused, and it is not easy to create natural live media in various compositions even though there is assistance of a third party.

Various embodiments of the disclosure may provide a method and a server for generating image data through a plurality of cameras capable of generating automatically edited image data by automatically selecting a main camera according to a preset condition when an image is captured through the plurality of cameras.

Various embodiments of the disclosure may provide a method and a server for generating image data through a plurality of cameras capable of generating automatically edited image data by automatically selecting a main camera on the basis of a predefined template for each media type when an image is captured through the plurality of cameras.

Various embodiments of the disclosure may provide a method and a server for generating image data through a plurality of cameras capable of generating automatically edited image data by automatically selecting a main camera according to a predetermined user gesture when an image is captured through the plurality of cameras.

Various embodiments of the disclosure may provide a method and a server for generating image data through a plurality of cameras capable of generating automatically edited image data by automatically selecting a main camera according to a preset condition and adding information to captured image data when an image is captured through the plurality of cameras.

In accordance with an aspect of the disclosure, a server is provided. The server includes: a communication circuit; and a processor electrically connected to the communication circuit, wherein the processor is configured to receive image data of a first camera selected as a main camera among image data captured by a plurality of cameras through the communication circuit, transmit the received image data of the first camera to a real-time broadcasting server through the communication circuit, and when a second camera of the plurality of cameras satisfies a selection condition of a predetermined main camera, transmit image data of the second camera to the real-time broadcasting server through the communication circuit.

In accordance with another aspect of the disclosure, a method of generating image data through a plurality of cameras is provided. The method includes: receiving image data of a first camera selected as a main camera among image data captured by a plurality of cameras through a communication circuit; transmitting the received image data of the first camera to a real-time broadcasting server through the communication circuit; determining whether a second camera of the plurality of cameras satisfies a selection condition of a predetermined main camera; and when the second camera of the plurality of cameras satisfies the selection condition of the predetermined main camera on the basis of a result of the determination, transmitting image data of the second camera to the real-time broadcasting server through the communication circuit.

A method and a server for generating image data through a plurality of cameras according to various embodiments can generate automatically edited image data by automatically selecting a main camera according to a preset condition when an image is captured through the plurality of cameras.

A method and a server for generating image data through a plurality of cameras according to various embodiments can generate automatically edited image data by automatically selecting a main camera on the basis of a predefined template for each media type when an image is captured through the plurality of cameras.

A method and a server for generating image data through a plurality of cameras according to various embodiments can generate automatically edited image data by automatically selecting a main camera according to a predetermined user gesture or a preset condition when an image is captured through the plurality of cameras.

BRIEF DESCRIPTION OF THE DRAWINGS

FIGS. 7A, 7B, 7C, 7D, 7E, and 7F illustrate examples of a combination of a plurality of cameras according to various embodiments of the disclosure;

FIG. 10 illustrates an example of displaying a state image of a plurality of cameras according to various embodiments of the disclosure;

FIGS. 13A, 13B, and 13C illustrate an example of the camera control by a user gesture according to various embodiments of the disclosure;

FIGS. 23 and 24 illustrate examples of automatically switching composition between a plurality of cameras according to various embodiments of the disclosure;

DETAILED DESCRIPTION

Figure 1:
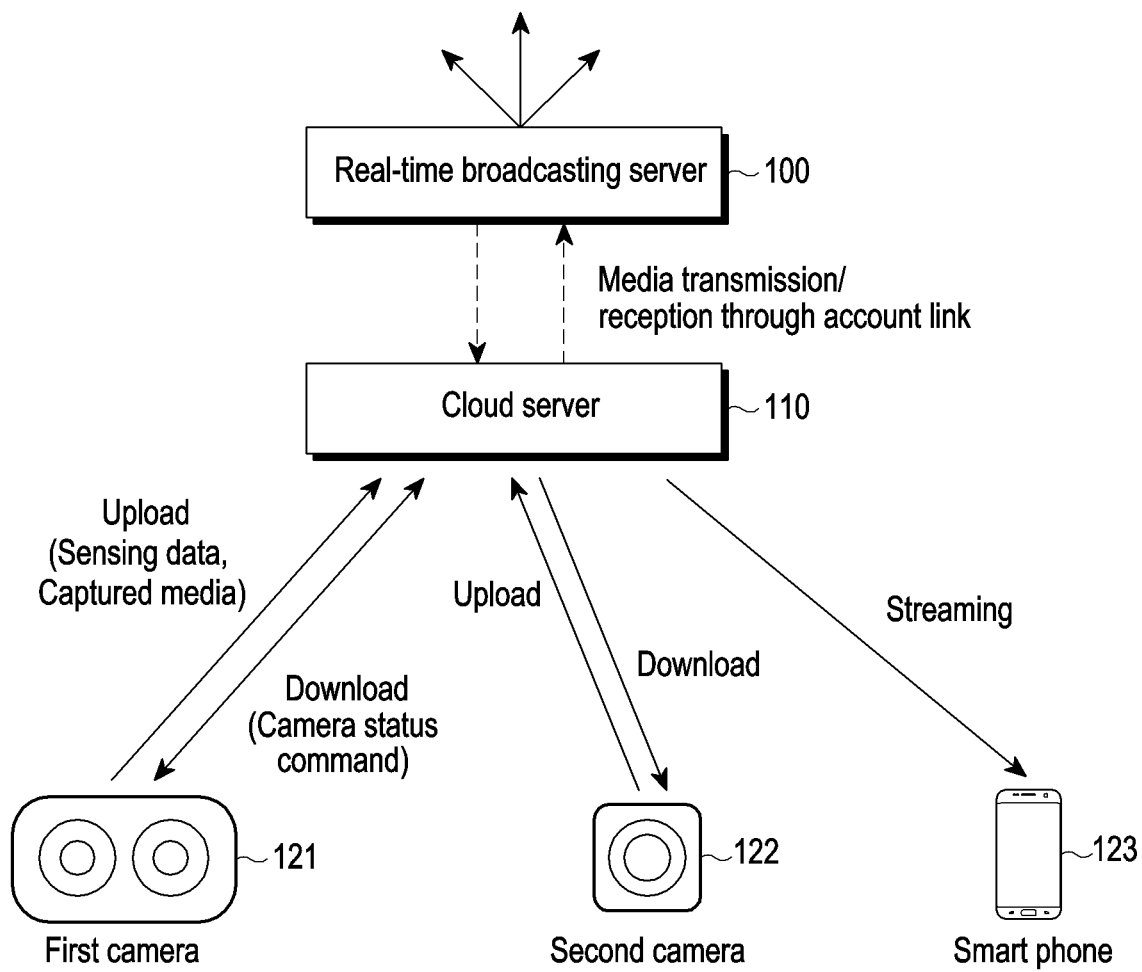
FIG. 1 illustrates an example of the configuration of a network according to various embodiments of the disclosure.

Hereinafter, various embodiments of the disclosure will be described with reference to the accompanying drawings. However, it should be appreciated that they are not intended to limit the disclosure to particular embodiments and the disclosure includes various changes, equivalents, or alternatives for the embodiments of the disclosure. With regard to the description of the drawings, similar reference numerals may be used to designate similar or relevant elements.

As used herein, the expression "have", "may have", "include", or "may include" refers to the existence of a corresponding feature (e.g., numeral, function, operation, or constituent element such as component) and does not exclude the existence of additional features.

As used herein, the expression "A or B", "at least one of A and/or B", or "one of more of A and/or B" may include all possible combinations of items enumerated together. For example, "A or B", "at least one of A and B", or "at least one of A or B" may refer to all of (1) including at least one A, (2) including at least one B, or (3) including all of at least one A and at least one B.

The expressions "a first", "a second", "the first", "the second", and the like as used in various embodiments may modify various elements regardless of the order and/or the importance thereof, and does not limit the corresponding elements. These expressions may be used to distinguish between one element and any other element. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it could be understood that when an element (e.g., first element) is referred to as being "directly connected," or "directly coupled" to another element (second element), there are no element (e.g., third element) interposed between them.

The expression "configured to" used in the disclosure may be interchangeably used with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device (e.g., smart glasses, head-mounted device (HMD)), electronic clothing, electronic bracelet, electronic necklace, electronic accessory (appcessory), electronic tattoo, smart mirror, or smart watch).

According to some embodiments, the electronic device may be a smart home appliance. The smart home appliance may include at least one of, for example, a television, a digital video disk (DVD) player, an audio, a refrigerator, an air conditioner, a vacuum cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to other embodiments, the electronic device may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, an automatic teller's machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.).

According to some embodiments, the electronic device may include at least one of a part of furniture or a building/structure, an electronic board, an electronic signature receiving device, a projector, and various kinds of measuring instruments (e.g., water meter, electric meter, gas meter, radio wave meter, etc.). In various embodiments, the electronic device may be a flexible electronic device. Further, the electronic device according to embodiments of the disclosure is not limited to the aforementioned devices, and may include a new electronic device according to the development of technology.

Various embodiments of the disclosure described below disclose a method and a server for generating image data through a plurality of cameras capable of generating automatically edited image data by automatically selecting a main camera according to the preset condition when an image is captured through the plurality of cameras.

In the following description, a camera may be replaced with various electronic devices described above. For example, any electronic device including a camera module capable of acquiring image data through an image sensor may be replaced with a camera described below. In the following description, a cloud server is described as an example of a server, but the server is not limited to a specific type server or a specific name server, and any type of device capable of registering a plurality of user accounts, receiving image data corresponding to each user account through a communication network, and transmitting the image data to a real-time broadcasting server may be included in the server.

FIG. 1 illustrates an example of the configuration of a network according to various embodiments of the disclosure. Referring to FIG. 1, the network according to an embodiment of the disclosure may include a real-time broadcasting server 100, a cloud server 110, a plurality of cameras 121 and 122, and an electronic device (for example, a smart phone) 123. Although FIG. 1 illustrates two cameras by way of example, three or more cameras may be included. According to various embodiments, the first camera 121 or the second camera 122 may be replaced with various types of electronic devices having not only a camera-dedicated device but also a camera module.

The first camera 121 may be a camera having a dual lens therein, and the second camera 122 may be a camera having a single lens therein. Each of the cameras 121 and 122 may transmit captured image data and sensed user interaction data to the cloud server 110. Each of the cameras 121 and 122 may receive a control signal from the cloud server 110. According to various embodiments, the control signal received from the cloud server 110 may include a signal corresponding to selection of a main camera.

According to an embodiment of the disclosure, the user may log in to the cloud server 110 with a user account through the electronic device 123 and register or configure each of the cameras 121 and 122 as a device or a camera for real-time broadcasting.

According to various embodiments described below, the cloud server 110 may select one of the first camera 121 and the second camera 122 as a main camera and transmit image data captured by a camera selected as the main camera from the plurality of cameras 121 and 122 to the real-time broadcasting server 100, so as to broadcast the captured image of the main camera in real time. According to various embodiments, the cloud server 110 may receive the captured image data from each of the first camera 121 and the second camera 122 in real time, select image data of the camera selected as the main camera, and transmit the selected image data to the real-time broadcasting server 100. According to various embodiments, the cloud server 110 may receive the captured image data from the camera selected as the main camera from the first camera 121 and the second camera 122 in real time and, when the main camera is changed, receive captured image data from the changed camera in real time. When the main camera is changed, the cloud server 110 may perform cut-editing such that the image data of the previous camera and the image data of the camera after the change are naturally connected, and transmit the cut-edited image data to the real-time broadcasting server 100.

The edited image data transmitted to the real-time broadcasting server 100 may be streaming-serviced from the real-time broadcasting server 100 or the cloud server 110 to the electronic device 123.

According to various embodiments of the disclosure, the cloud server 110 may automatically generate various composition image data by automatically switching the main camera to transmit the image data to the real-time broadcasting server 100 among the plurality of cameras 121 and 122. According to various embodiments, the cloud server 110 may select one of the plurality of cameras 121 and 122 as the main camera. When the electronic device 123 includes a camera module, the electronic device 123 may be included in the plurality of cameras and selected as the main camera. According to various embodiments, the electronic device 123 may perform at least some of the functions of the cloud server 110. For example, the electronic device 123 may select the main camera from the plurality of cameras 121 and 122 according to a preset condition.

When the main camera is selected from the plurality of cameras 121 and 122, the cloud server 110 may transmit information corresponding to selection of the main camera to at least one of the plurality of cameras 121 and 122. Each of the cameras 121 and 122 receiving the information corresponding to the selection of the main camera from the cloud server 110 may perform a preset operation corresponding to reception of the information. For example, when the cloud server 110 changes the main camera to the second camera 122 in the state in which the first camera 121 is selected as the main camera, the cloud server 110 may transmit a message indicating that the configuration of the first camera 121 as the main camera ends and transmit a message indicating that the second camera 122 is configured as a new main camera.

According to various embodiments, the image data edited by the cloud server 110 may be stored in the cloud server 110 or the real-time broadcasting server 100, and the user may re-edit the stored image data through the electronic device 123 or another electronic device in the future.

According to various embodiments, each of the cameras 121 and 122 may transmit data generated by each camera to the cloud server 110. The cloud server 110 may select the main camera on the basis of at least the sensed data received from each of the cameras 121 and 122.

According to various embodiments, the cloud server 110 may link to the real-time broadcasting server 100 through an account. For example, the user of the electronic device 123 may log in to the cloud server 110 with the registered account and may log in to the real-time broadcasting server 100 with the same account or another account. The user may link his/her account registered in the cloud server 110 with his/her account registered in the real-time broadcasting server 100. When the user logs in to the cloud server 110 through the electronic device 123 and the image data captured by the first camera 121 or the second camera 122 is transmitted to the cloud server 110, the cloud server 110 may transmit the image data through the account of the real-time broadcasting server 100 linked with the account of the cloud server 110 for the user. According to various embodiments, the user may simultaneously log in to both the cloud server 110 and the real-time broadcasting server 100 at once and may separately log in to each of the servers.

Figure 2:
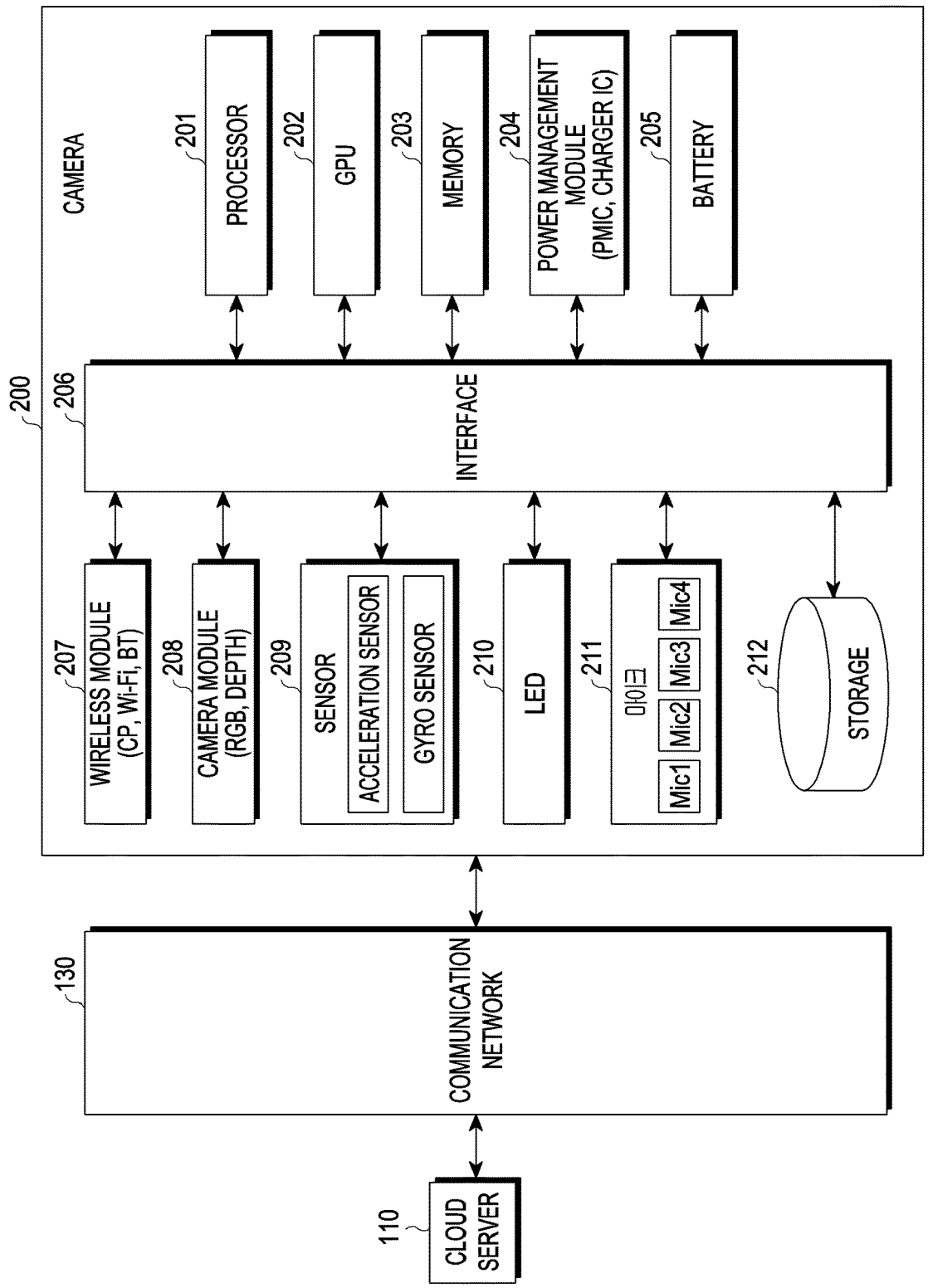
FIG. 2 is a block diagram of hardware of a camera according to various embodiments of the disclosure.

FIG. 2 is a block diagram of hardware of a camera according to various embodiments of the disclosure. Referring to FIG. 2, a camera 200 (for example, the first camera 121 or the second camera 122 of FIG. 1) according to various embodiments of the disclosure may communicate with the cloud server 110 through the communication network 130.

The communication network 130 is, for example, a cellular communication protocol, and may include at least one of LTE, LTE-A, CDMA, WCDMA, UMTS, WiBro, and GSM. The communication network 130 may be implemented regardless of an aspect of communication such as wired/wireless communication, and may be implemented as various communication networks including a Personal Area Network (PAN), a Local Area Network (LAN), a Metropolitan Area Network (MAN), a Wide Area Network (WAN) and the like. Further, the communication network 130 may be a known World Wide Web (WWW), and may use a wireless transmission technology utilized for short distance communication such as Infrared Data Association (IrDA) or Bluetooth.

The communication network 130 may include short-range wireless communication, for example, at least one of Wireless Fidelity (WiFi), Light Fidelity (LiFi), Bluetooth, Bluetooth Low Energy (BLE), ZigBee, Near Field Communication (NFC), or magnetic secure transmission.

Figure 28:
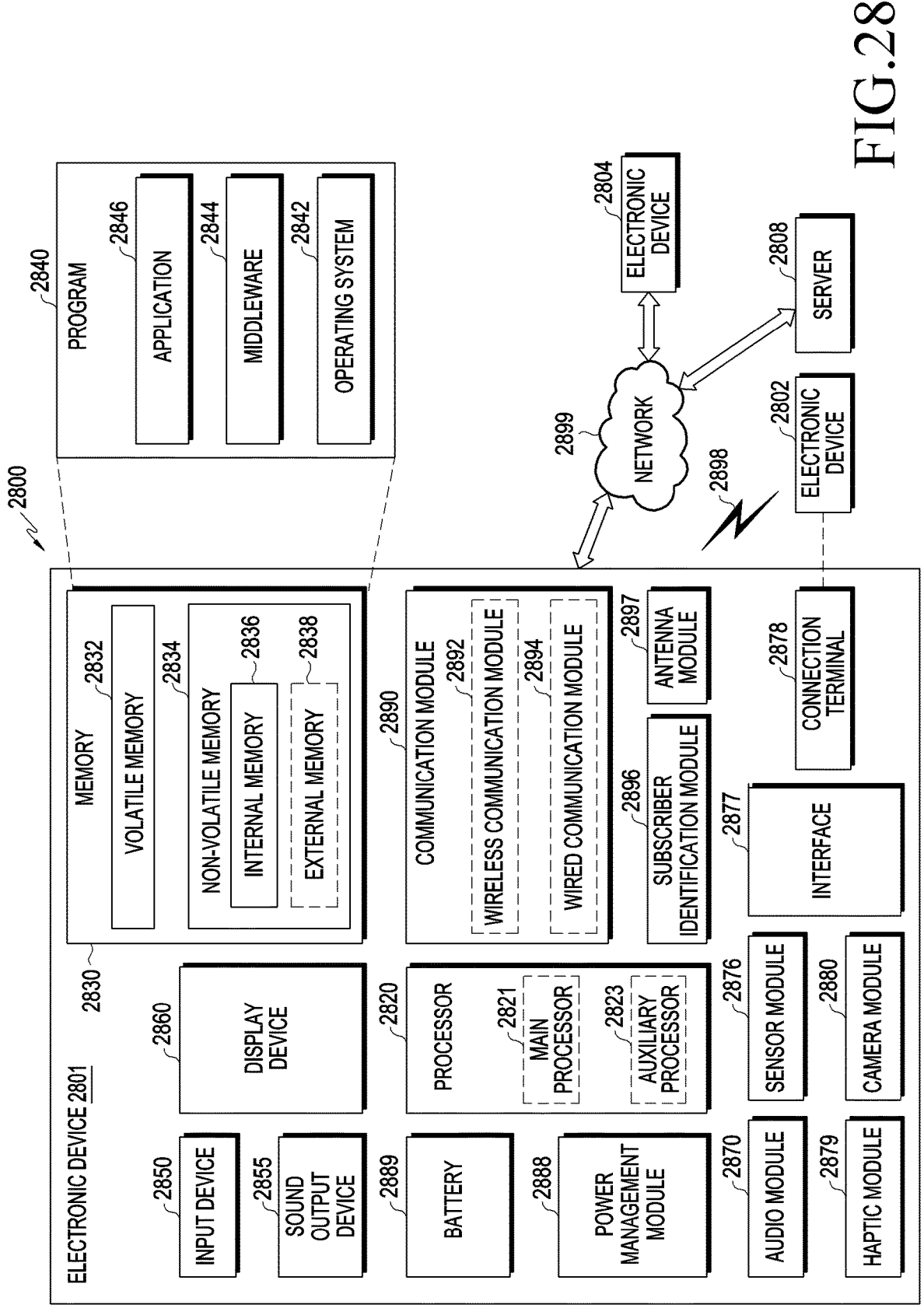
FIG. 28 illustrates a network environment including electronic devices generating image data according to various embodiments of the disclosure.

According to various embodiments, the camera 200 may include a processor 201, a Graphic Processing Unit (GPU) 202, a memory 203, a power management module 204, a battery 205, a wireless module 207, a camera module 208, a sensor 209, an LED 210, a microphone 211, and storage 212. Each of the elements of the camera 200 may communicate with each other through an interface 206. At least some functions of the function blocks may correspond to functions of function blocks of an electronic device 2800 described in detail with reference to FIG. 28, and a description that overlaps a description of FIG. 28 is omitted.

Image data captured through the camera module 208 may be transmitted to the cloud server 110 through the wireless module 207. According to various embodiments, the processor 201 may perform control to transmit image data captured by the camera module 208 to the cloud server 110 only when the camera is selected as the main camera.

The processor 201 may transmit data sensed by each sensor 209 to the cloud server 110 and thus use the sensed data to determine whether the camera 200 is selected as the main camera. According to various embodiments, instructions for performing each operation of the processor 201 may be stored in the memory 203.

The LED 210 may display and distinguish states of the camera 200 through various colors or lighting patterns. For example, when the camera 200 is selected as the main camera, the LED 210 may be implemented to emit a light of a predetermined color. The microphone 211 may include a plurality of microphones and transmit voice data input from the microphone 211 to the cloud server 110, and thus use the input voice data to determine whether the camera 200 is selected as the main camera. The storage 212 may store image data captured through the camera module 208.

The GPU 202 may image-process the data captured through the camera module 208. The power management module 204 may receive power from the battery 205 and distribute or control power to each module or function unit of the camera 200.

Figure 3:
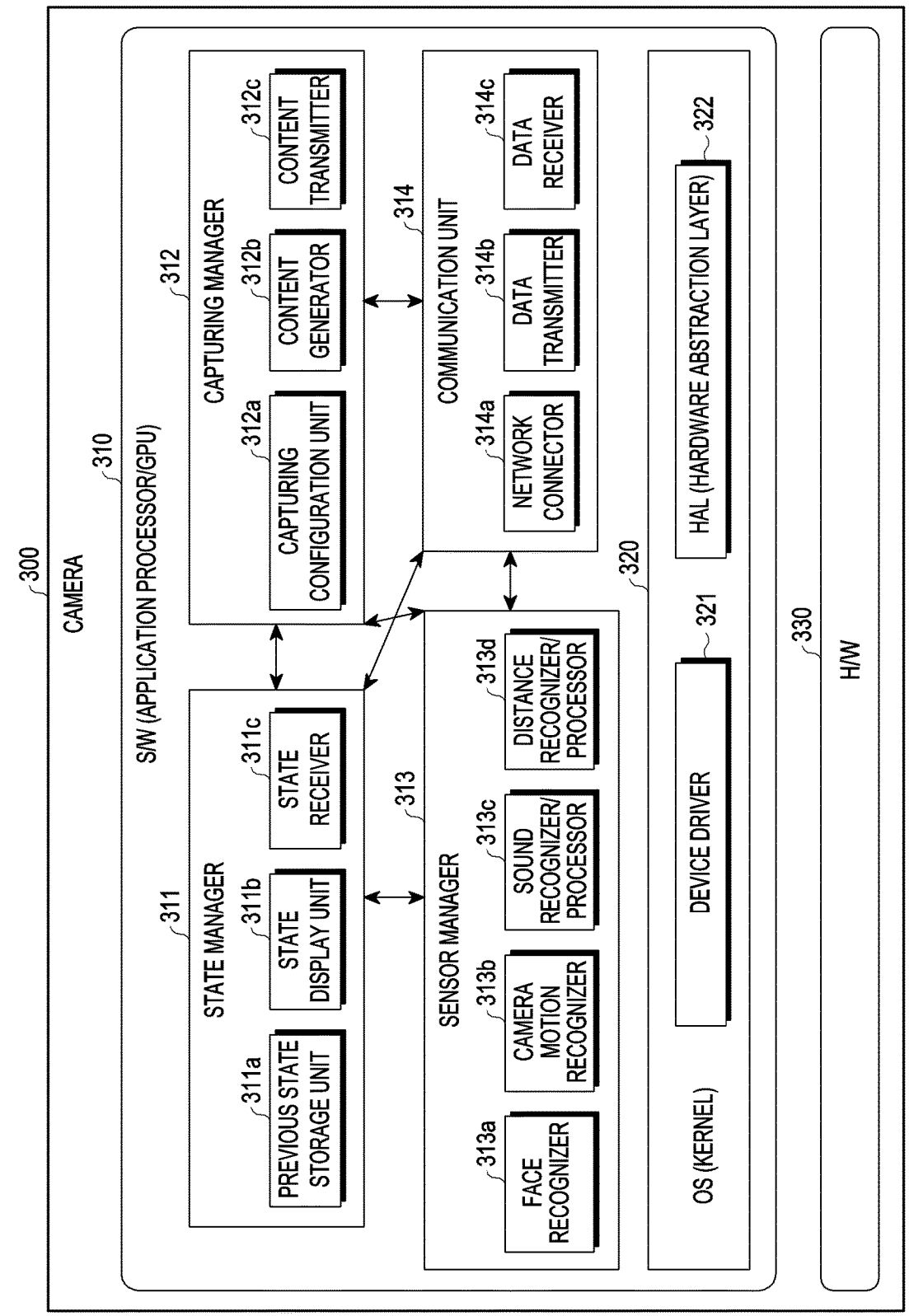
FIG. 3 is a block diagram of software of a camera according to various embodiments of the disclosure.

FIG. 3 is a block diagram of software of a camera according to various embodiments of the disclosure. Referring to FIG. 3, a camera 300 may include software 310 and a hardware block 330. The software 310 may include a state manager 311, a capturing manager 312, a sensor manager 313, a communication unit 314, and an Operating System (OS) 320. The operation system 320 may include a device driver 321 and a Hardware Abstraction Layer (HAL) 322.

The state manager 311 may store state information (for example, each state information illustrated in FIG. 9) of the camera 300, and may include a previous state storage unit 311a, a state display unit 311b, and a state receiver 311c. The previous state storage unit 311a may store previous state information before a change to the current state, the state display unit 311b may perform control to display the current state through an LED, and the state receiver 311c may receive state information from a cloud server (for example, the cloud server 110 of FIG. 1 or FIG. 2) through the communication unit 314.

The capturing manager 312 may include a capturing configuration unit 312a, a content generator 312b, and a content transmitter 312c. The capturing configuration unit 312a may provide functions related to each configuration for image capturing of the camera 300, the content generator 312b may generate content from the captured image data, and content transmitter 312c may perform an operation of transmitting generated content to the communication unit 314 in order to transmit the content to the cloud server.

The sensor manager 313 may perform an operation of managing sensing data used for selecting the main camera according to various embodiments of the disclosure. The sensor manager 313 may include a face recognizer 313a, a camera motion recognizer 313b, a sound recognizer/processor 313c, and a distance recognizer/processor 313d. The face recognizer 313a may perform a function of recognizing a face in image data captured by the camera 300, and the camera motion recognizer 313b may perform a function of recognizing motion of the camera 300. The sound recognizer/processor 313c may perform a function of recognizing and processing voice data input through the microphone. The distance recognizer/processor 313d may perform a function of measuring and processing a distance between the camera 300 and an object or a person.

The communication unit 314 may include a network connector 314a, a data transmitter 314b, and a data receiver 314c. The network connector 314a may perform the connection to the cloud server, the data receiver 314c may receive generated content from the capturing manager 312, and the data transmitter 314b may transmit the received content to the cloud server. According to various embodiments, the data receiver 314c may receive user interaction data from the sensor manager 311, and the data transmitter 314b may transmit the received user interaction data to the cloud server.

Figure 4:
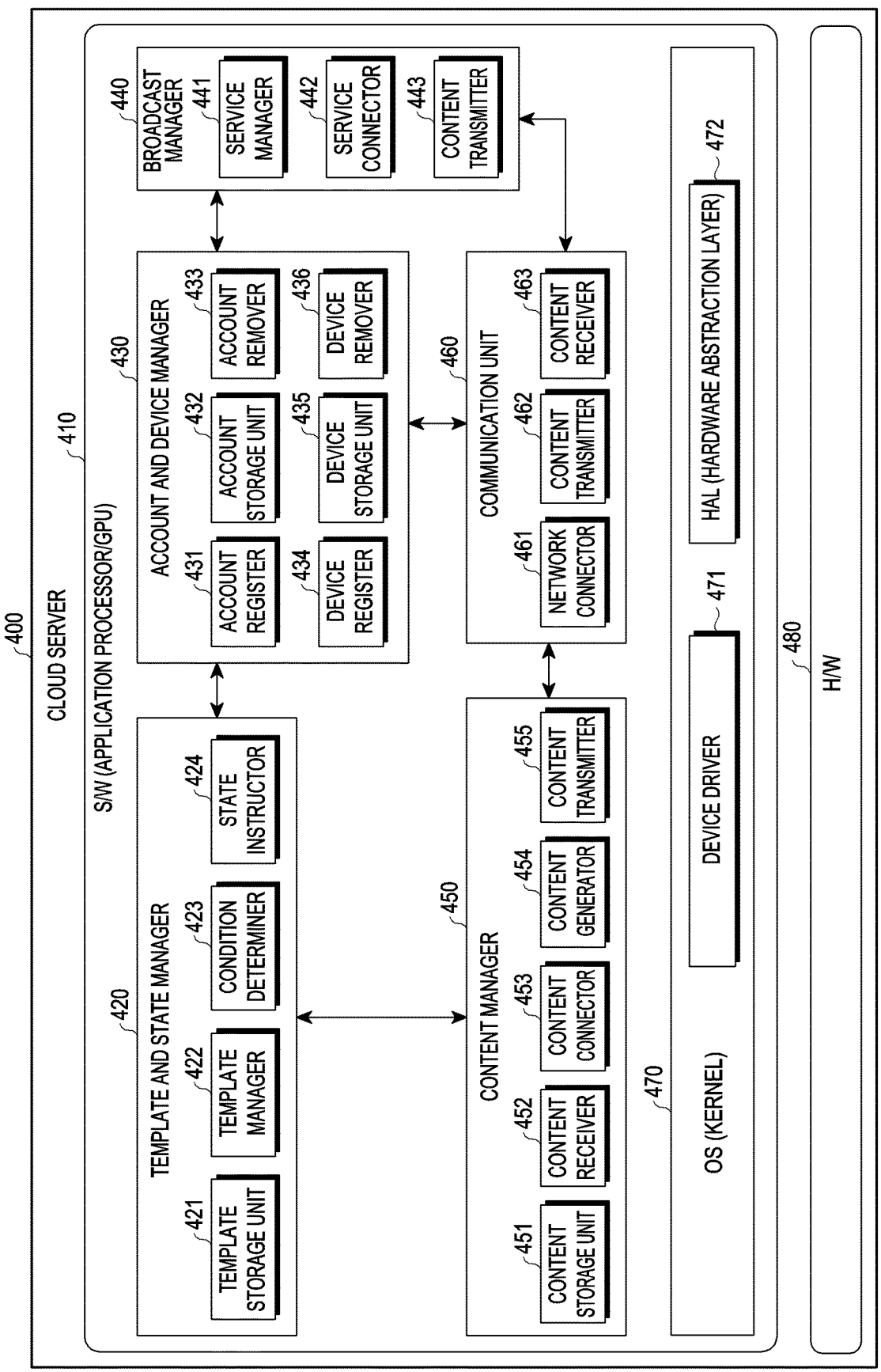
FIG. 4 is a block diagram of a cloud server according to various embodiments of the disclosure.

FIG. 4 is a block diagram of a cloud server according to various embodiments of the disclosure. Referring to FIG. 4, a cloud server 400 according to various embodiments of the disclosure may include software 410 and a hardware block 480. The software 410 may include a template and state manager 420, an account and device manager 430, a broadcast manager 440, a content manager 450, a communication unit 460, and an Operating System (OS) 470. The operation system 470 may include a device driver 471 and a Hardware Abstraction Layer (HAL) 472.

The template and state manager 420 may include a template storage unit 421, a template manager 422, a condition determiner 423, and a state instructor 424. The template storage unit 421 may perform a function of storing template information according to various broadcast types described below. The template manager 422 may perform a function of configuring and managing various pieces of the stored template information. The condition determiner 423 may perform a function of determining whether a specific camera satisfies a main camera selection condition through information received from each camera on the basis of information stored in the template storage unit 421. When the main camera is determined through the condition determiner 423, the state instructor 424 may perform a function of transmitting a state instruction corresponding to the main camera to each camera.

The account and device manager 430 may include an account register 431, an account storage unit 432, an account remover 433, a device register 434, a device storage unit 435, and a device remover 436. The account register 431 may register a user account for real-time broadcasting, and the account storage unit 432 may store information on the registered account in the memory. The account remover 433 may remove the registered and stored account according to a user request. The device register 434 may register at least one camera to be connected for real-time broadcasting with respect to each user account for the real-time broadcasting, and the device storage unit 435 may store information on the registered device in the memory. The device remover 436 may remove the registered and stored device according to a user request.

The content manager 450 may include a content storage unit 451, a content receiver 452, a content connector 453, a content generator 454, and a content transmitter 455. When the content receiver 452 receives content, the received content may be stored through the content storage unit 451. According to various embodiments, when the main camera is changed, the content connector 453 may connect pieces of image data of respective cameras at the time point of the change, and cut-edited content may be generated through the content generator 454. The content transmitter 455 may transmit the cut-edited content generated through the content generator 454 to the communication unit 460.

The communication unit 460 may include a network connector 461, a content transmitter 462, and a content receiver 463. The network connector 461 may be connected to each camera or a broadcasting service server, the content receiver 463 may receive generated content from the content manager 450, and the content transmitter 462 may transmit the received content to the broadcasting service server.

The broadcast manager 440 may include a service manager 441, a service connector 442, and a content transmitter 443. The service manager 441 may perform management related to a real-time broadcasting service, the service connector 442 may perform the connection for a real-time service with the real-time broadcasting server, and the content transmitter 443 may transmit the content such that the content is broadcasted in real time through the real-time broadcasting server.

According to various embodiments of the disclosure, each function unit or a module may be a functional or structural combination of hardware for implementing the technical idea of various embodiments of the disclosure and software for driving the hardware. For example, each function unit or a module may be a logical unit of a predetermined code and a hardware resource for executing the predetermine code, and it may be easily inferred by those skilled in the art that the function unit or the module does not necessarily refer to a physically connected code or one type hardware.

A server according to one of various embodiments of the disclosure may include: a communication circuit; and a processor electrically connected to the communication circuit, wherein the processor may be configured to receive image data of a first camera selected as a main camera among image data captured by a plurality of cameras through the communication circuit, transmit the received image data of the first camera to a real-time broadcasting server through the communication circuit, and when a second camera of the plurality of cameras satisfies a selection condition of a predetermined main camera, transmit image data of the second camera to the real-time broadcasting server through the communication circuit.

According to various embodiments of the disclosure, when the second camera of the plurality of cameras satisfies the selection condition of the predetermined main camera, the processor may be configured to transmit a control signal corresponding to the selection of the main camera to the second camera.

According to various embodiments of the disclosure, image data captured by each camera may be analyzed and a camera having analyzed image data that satisfies a preset condition may be selected as the main camera.

According to various embodiments of the disclosure, a direction of a face may be recognized in the analyzed image data, and the main camera may be selected based on the recognized direction of the face.

According to various embodiments of the disclosure, movement of an object may be recognized in the analyzed image data, and the main camera may be selected based on the recognized movement of the object.

According to various embodiments of the disclosure, movement of the camera may be recognized, and the main camera may be selected based on the recognized movement of the camera.

According to various embodiments of the disclosure, the size of a user utterance sound input into a microphone of each camera may be determined, and the main camera is selected based on the size of the user utterance sound.

According to various embodiments of the disclosure, a distance between an object and each camera may be measured, and the main camera may be selected based on the measured distance.

According to various embodiments of the disclosure, a user gesture may be determined by each camera, and the main camera may be selected based on the determined user gesture.

According to various embodiments of the disclosure, a reference for the selection of the main camera may be differently set according to a type of content to be broadcasted.

Figure 5:
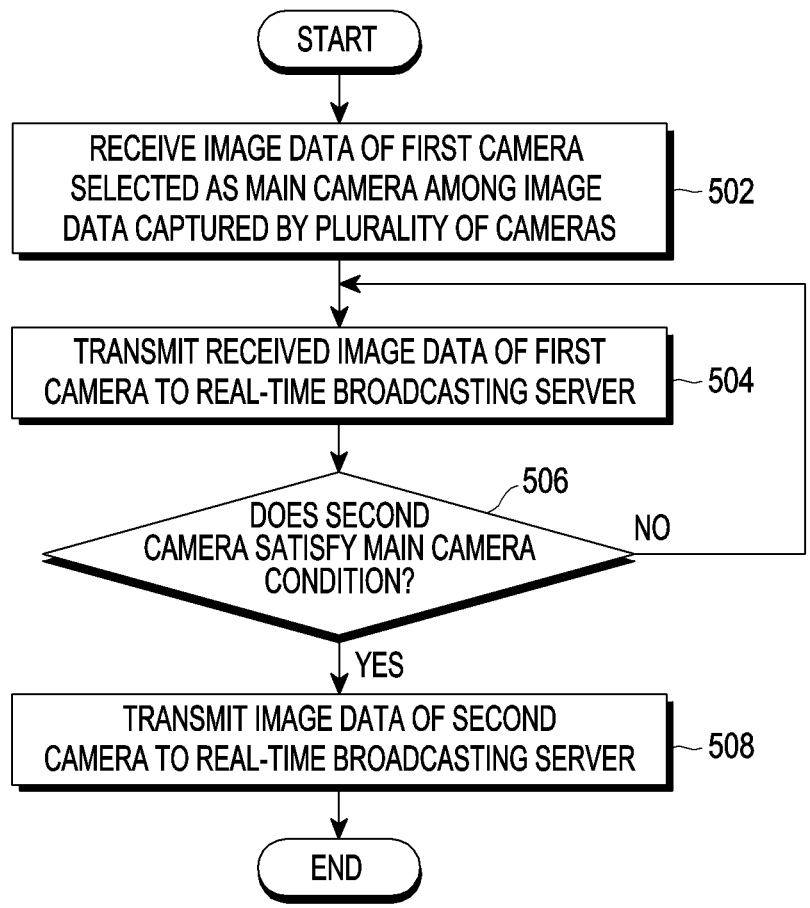
FIG. 5 is a flowchart illustrating a method by which a server generates image data according to various embodiments of the disclosure.

FIG. 5 is a flowchart illustrating a method by which a server generates image data according to various embodiments of the disclosure. Referring to FIG. 5, in operation 502, a cloud server (for example, the cloud server 110 of FIG. 1) may receive image data of a first camera selected as a main camera among image data captured by a plurality of cameras (for example, the first camera 121 or the second camera 122 of FIG. 1).

In operation 504, the cloud server may transmit the received image data of the first camera to a real-time broadcasting server.

The cloud server may determine whether the second camera satisfies a condition of the main camera in operation 506, and when the second camera satisfies the condition of the main camera on the basis of the determination result, may transmit image data of the second camera to the real-time broadcasting server in operation 508.

According to various embodiments of the disclosure, at least one of the operations illustrated in FIG. 5 may be omitted, or at least one other operation may be added to the operations. In addition, the operations may be sequentially processed as illustrated in FIG. 5, and the execution sequence of at least one operation may be switched with that of another operation. Furthermore, the operations illustrated in FIG. 5 may be performed in the electronic device or a server. At least one of the operations illustrated in FIG. 5 may be performed within the electronic device and the remaining operations may be performed by the server.

A method of generating image data through a plurality of cameras according to one of various embodiments of the disclosure may include an operation of receiving image data of a first camera selected as a main camera among image data captured by a plurality of cameras through a communication circuit, an operation of transmitting the received image data of the first camera to a real-time broadcasting server through the communication circuit, an operation of determining whether a second camera of the plurality of cameras satisfies a selection condition of a predetermined main camera, and an operation of, when the second camera of the plurality of cameras satisfies the selection condition of the predetermined main camera on the basis of a result of the determination, transmitting image data of the second camera to the real-time broadcasting server through the communication circuit.

According to various embodiments of the disclosure, the method may further include an operation of, when the second camera of the plurality of cameras satisfies the selection condition of the predetermined main camera, transmitting a control signal corresponding to the selection of the main camera to the second camera.

According to various embodiments of the disclosure, image data captured by each camera may be analyzed and a camera having analyzed image data that satisfies a preset condition may be selected as the main camera.

According to various embodiments of the disclosure, a direction of a face may be recognized in the analyzed image data, and the main camera may be selected based on the recognized direction of the face.

According to various embodiments of the disclosure, movement of an object may be recognized in the analyzed image data, and the main camera may be selected based on the recognized movement of the object.

According to various embodiments of the disclosure, movement of the camera may be recognized, and the main camera may be selected based on the recognized movement of the camera.

According to various embodiments of the disclosure, the size of a user utterance sound input into a microphone of each camera may be determined, and the main camera is selected based on the size of the user utterance sound.

According to various embodiments of the disclosure, a distance between an object and each camera may be measured, and the main camera may be selected based on the measured distance.

According to various embodiments of the disclosure, a user gesture may be determined by each camera, and the main camera may be selected based on the determined user gesture.

According to various embodiments of the disclosure, a reference for the selection of the main camera may be differently set according to a type of content to be broadcasted.

According to various embodiments of the disclosure, the method may further include an operation of receiving a request for inserting additional information or an additional image into the image data, an operation of generating the additional information or the additional image in response to reception of the request, and an operation of inserting the generated additional information or additional image into the image data.

Figure 6:
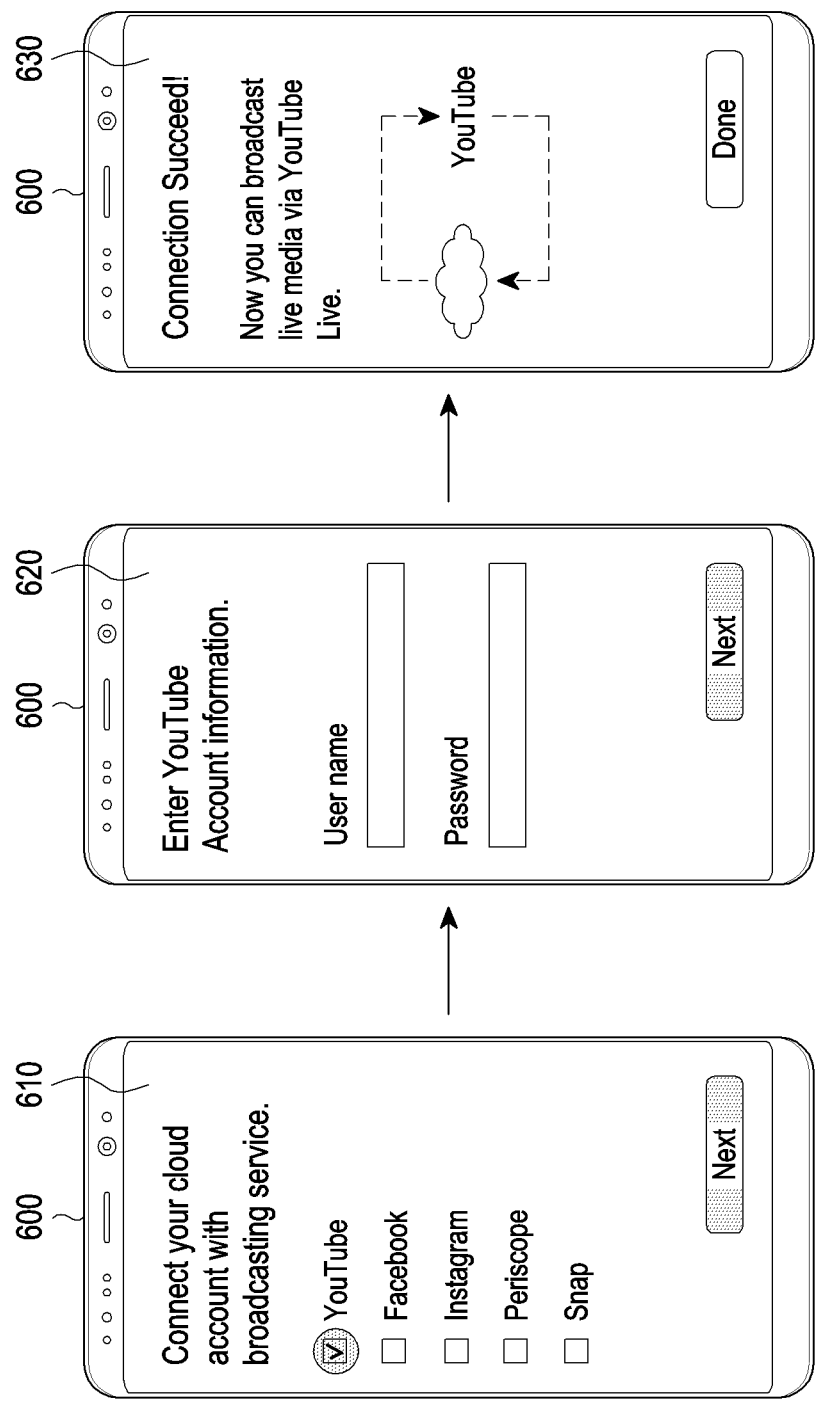
FIG. 6 illustrates screens for configuring an account link between servers by an electronic device according to various embodiments of the disclosure.

FIG. 6 illustrates screens for configuring an account link between servers by an electronic device according to various embodiments of the disclosure. Referring to FIG. 6, in order to broadcast cut-edited media of a multi-camera through a cloud server, a user may link a cloud account with a media service platform (for example, the real-time broadcasting server 100 of FIG. 1) (for example, YouTube™, Facebook™, Instagram™, Periscope™, and Snap™) mainly used by the user through an electronic device 600 (for example, a smart phone).

For example, when a cloud account of a specific real-time broadcasting server (for example, a YouTube™ server) is selected in a first screen 610 of the electronic device 600, the screen switches to a second screen 620 and information (for example, a name and a password) for logging in to the corresponding real-time broadcasting server may be input. When the information input into the second screen 620 is normally authenticated, information indicating that accounts of the cloud server and the broadcasting service server are connected to each other may be displayed through a third screen 630.

According to various embodiments, a service platform (for example, the real-time broadcasting server) may be linked to the cloud account and recognize the cloud server as one camera, receive a live media source through one channel, and transmit the media source in real time. For example, media acquired from a plurality of cameras and cut-edited may obtain the same effect as if the media is broadcasted by connecting one camera to the service platform through a single cloud account. According to various embodiments, through the linked account, the cloud service may receive an image transmitted from the real-time broadcasting server and user feedback (replies and stickers) data from the real-time broadcasting server, and additionally re-edit image data on the basis of the part having many replies.

FIGS. 7A, 7B, 7C, 7D, 7E, and 7F illustrate examples of a combination of a plurality of cameras according to various embodiments of the disclosure.

FIG. 7A illustrates an example of combining a plurality of smart phones to configure a plurality of cameras, FIG. 7B illustrates an example of combining a plurality of dual-lens cameras to configure a plurality of cameras, FIG. 7C illustrates an example of combining a plurality of single-lens cameras to configure a plurality of cameras, FIG. 7D illustrates an example of combining a dual-lens camera and a single-lens camera to configure a plurality of cameras, FIG. 7E illustrates an example of combining a smart phone and a dual-lens camera to configure a plurality of cameras, and FIG. 7F illustrates an example of combining a smart phone and a single-lens camera to configure a plurality of cameras. Although FIGS. 7A, 7B, 7C, 7D, 7E, and 7F illustrate that two cameras or smart phones configure a plurality of cameras, three or more cameras or electronic devices may configure a plurality of cameras according to various embodiments.

Figure 8:
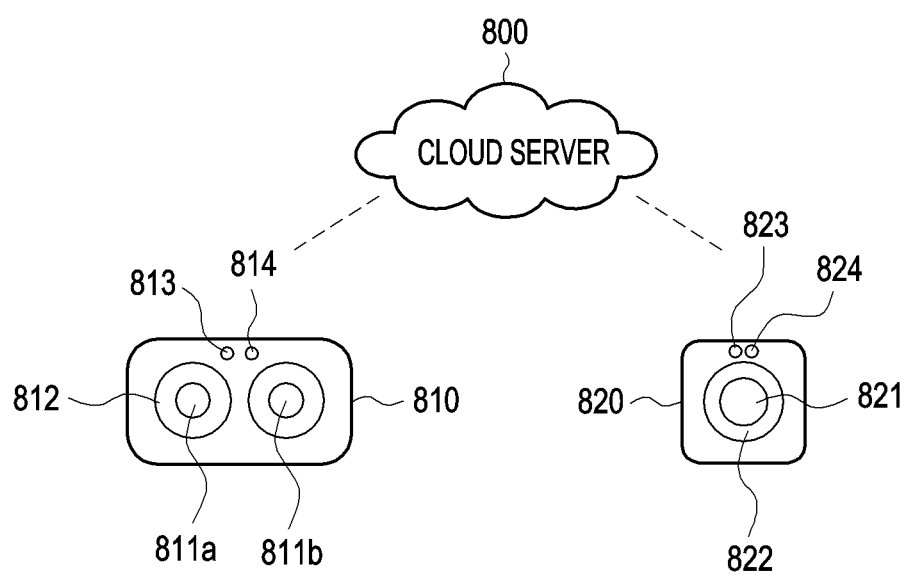
FIG. 8 illustrates the connection between a plurality of cameras and a server according to various embodiments of the disclosure.

FIG. 8 illustrates the connection between a plurality of cameras and a server according to various embodiments of the disclosure. Referring to FIG. 8, according to various embodiments, a plurality of cameras is configured through a combination of a dual-lens camera 810 and a single-lens camera 820, and a real-time broadcasting service may be provided through the connection between the plurality of cameras and a cloud server 800.

The dual-lens camera 810 is a camera including a dual lens having a wide-angle lens 811*a* and a general lens 811*b* and may perform switching capturing between wide-angle capturing and close-up capturing. The single-lens camera 820 is a camera including a general single camera 821 and may be attached to a desired location or carried by the user to perform free capturing.

The dual-lens camera 810 and the single-lens camera 820 may include depth sensors 812 and 822, respectively, to track a user face direction (user's eyes) and measure a distance between the user and the camera or between cameras.

The dual-lens camera 810 and the single-lens camera 820 may include at least one microphone 813 and 823, respectively to predict a relative location at which a user utterance is generated through the size and a direction of a sensed sound, distinguish between relative noise of cameras, and transmit a noise-canceled sound to the cloud server 800.

The dual-lens camera 810 and the single-lens camera 820 may include communication modules (for example, cellular/Wi-Fi/BT) to be connected to a wired/wireless communication network anywhere and transmit captured image data to the cloud server 800, and the communication module may be used to transmit and receive information between cameras.

The dual-lens camera 810 and the single-lens camera 820 may include LEDs 814 and 824, respectively, to provide feedback so that the user can recognize the current state of the camera. According to various embodiments, the current state of the camera may include power on/off, whether there is a main camera, or whether to perform capture.

Figure 9:
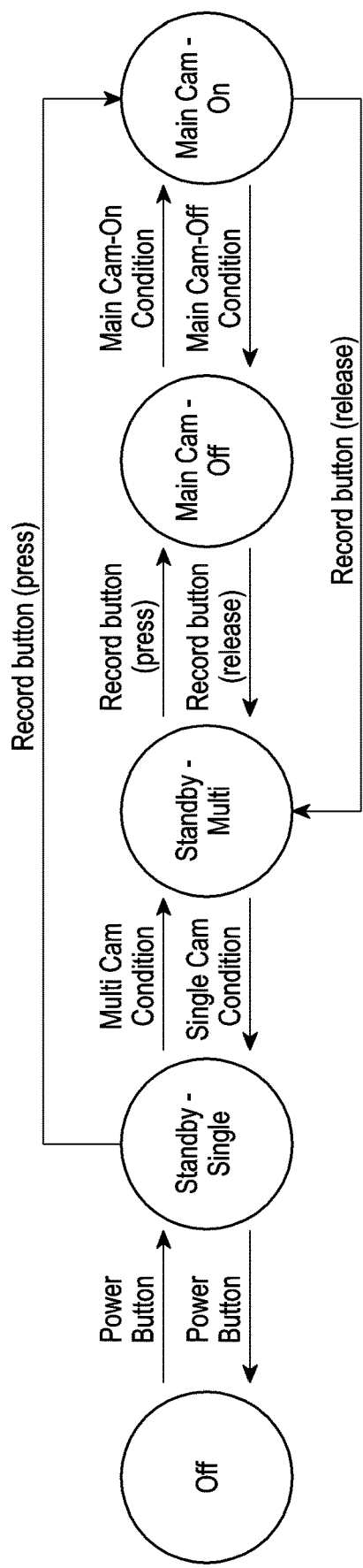
FIG. 9 illustrates the state transition relation of a plurality of cameras according to various embodiments of the disclosure.

FIG. 9 illustrates the state transition relation of a plurality of cameras according to various embodiments of the disclosure. Referring to FIG. 9, each camera may operate in at least one of an off state, a standby-single state, a standby-multi state, a main camera-off (main cam-off) state, a main camera-on (main cam-on) state.

Each camera may switch to the standby-single state when a power button is pressed in the off state. Each camera may switch to the standby-multi state when a multi-camera condition is satisfied in the standby-single state. According to various embodiments, each camera may switch to the main camera-off state when a play or record button is pressed in the standby-multi state. Each camera may switch to the main camera-on state when a main camera condition is satisfied in the main camera-off state. According to various embodiments, whether the main camera condition is satisfied may be determined through a connected cloud server (for example, the cloud server 800 of FIG. 8).

Each camera may not satisfy the main camera condition in the main camera-on state or, when another camera satisfies the main camera condition, switch to the main camera-off state. Each camera may switch to the standby-multi state when a play or record stop button is pressed in the main camera-off state, and may switch to the standby-single state when the single camera condition is satisfied. Each state switching relation illustrated in FIG. 9 is only an example, and a specific state may be omitted or added according to various embodiments and a location for at least one state may be changed.

FIG. 10 illustrates an example of displaying a state image of a plurality of cameras according to various embodiments of the disclosure. Referring to FIG. 10, each camera may display a state image corresponding to the current state according to each state defined in FIG. 9. The state image is only an example, and may be changed in various forms. The image of FIG. 10 may be displayed on an electronic device (for example, the electronic device 123 of FIG. 1) or may be applied to LED lighting of each camera (for example, the first camera 121 of FIG. 1 or the second camera 122 of FIG. 1).

For example, an indication 1011 indicating that an LED is turned off may be displayed in an image of a dual-lens camera 1010. The dual-lens camera 1010 is in an off state in which power of the camera is turned off and may switch to the standby-single state through pressing of a power button.

When the dual-lens camera 1010 switches to the standby-single state, an indication 1012 indicating the LED is lighted with a blue color may be displayed in the image of the dual-lens camera 1010. The standby-single state indicates the state in which power of the dual-lens camera 1010 is turned on but power of other cameras (for example, a single-lens camera 1020) registered in the connected account is not turned on yet. In the standby-single state, it may be identified whether the state can switch to the standby-multi state by continuously checking the multi-camera condition.

In the standby-multi state, the indication 1012 indicating that the LED is lighted with the blue color may be displayed in the image of the dual-lens camera 1010, and an indication 1021 indicating that the LED is lighted with a blue color may be displayed in the image of the single-lens camera 1020. The standby-multi state may indicate the state in which one or more cameras registered in the connected account are turned on and a plurality of cameras within the registered account on the cloud are ready, and may switch to the main camera-off state when a capturing start function (for example, a record button) is performed in one of the plurality of cameras or the electronic device.

When the main camera is turned off, indications 1013 and 1022 indicating that the LED is lighted with a green color may be displayed in the images of the dual-lens camera 1010 and the single-lens camera 1020. The main camera-off state may be a state in which capturing is being performed but image data transmission to the cloud server is not performed for selection of the main camera and real-time broadcasting. The main camera-off state may switch to the main camera-on state by continuously checking a main camera-on state switching condition.

When the dual-lens camera 1010 satisfies the main camera conditions in the main camera-off state, the state may switch to the main camera-on state and an indication 1014 indicating the LED is lighted with a red color is displayed on the image of the main camera 1010. The main camera-on state is a state in which the dual-lens camera 1010 switches to the main camera for capturing content to be broadcasted in real time through the cloud server. The main camera-on state may switch to the main camera-off state by continuously checking the main camera off condition.

According to various embodiments of the disclosure, each camera may transmit event data generated by an image sensor, a camera motion sensor, or a sound sensor to the cloud server in real time, and the cloud server may determine whether the main camera switches on the basis of at least the received data. According to various embodiments, the cloud server may prioritize user interaction-related data suitable for the corresponding media type on the basis of the media type-specific template selected by the user, determine whether a detailed condition is satisfied, and determine the main camera switches.

According to various embodiments, when user interaction is generated while each camera captures an image, a sensor manager of each camera may transmit sensed event data to the cloud server through a communication unit.

A communication unit of the cloud server may receive event data, and a condition determiner may determine whether each camera satisfies a main camera condition.

For example, when it is recognized that a face direction is a forward direction through analysis of an image on the basis of image data captured by each camera, the cloud server may configure the camera as the main camera. According to various embodiments, the cloud server may receive information related to motion of the camera and, when motion of the camera satisfies a predetermined condition, configure the camera as the main camera. According to various embodiments, the cloud server may receive information on a distance between the user and the camera and, when the distance satisfies a predetermined condition, configure the camera as the main camera.

According to various embodiments, the cloud server may receive information on a sound size of user utterance and, when the utterance sound size satisfies a predetermined condition, configure the camera as the main camera. According to various embodiments, a camera having the largest utterance sound among sizes of user utterance sounds received from a plurality of cameras may be configured as the main camera.

According to various embodiments, the cloud server may analyze motion of the user or an object on the basis of image data captured by each camera and, when the motion of the user or the object satisfies a predetermined condition, configure the camera as the main camera.

According to various embodiments, the cloud server may identify a user gesture on the basis of image data captured by each camera and, when the identified user gesture has a predetermined pattern or direction, configure a specific camera as the main camera.

According to various embodiments, the condition determiner of the cloud server may determine one of a plurality of cameras as the main camera by determining whether there is interaction within a template selected by the user, a priority, and whether a main camera-on (Cam-On) condition is satisfied and determine one of a plurality of cameras as the main camera.

The cloud server may transmit a command for each camera role (the main camera or a non-main camera) to each camera through the communication unit. Each camera may play a predetermined role according to the command received from the cloud server. For example, a camera determined as the main camera may display an LED color corresponding to the main camera through a state display unit and transmit captured image data to the cloud server in real time.

Figure 11A:
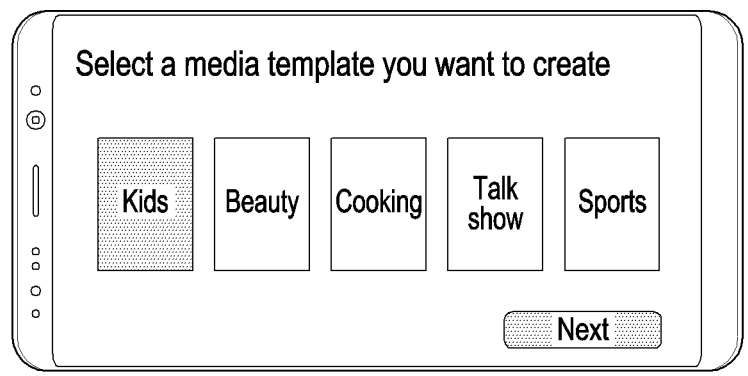
FIGS. 11A, 11B, and 11C illustrate an example of selection of a media type-specific template according to various embodiments of the disclosure.
Figure 11B:
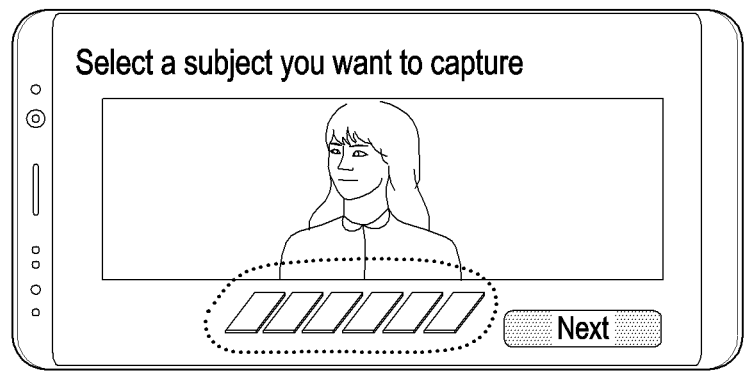
Figure 11C:
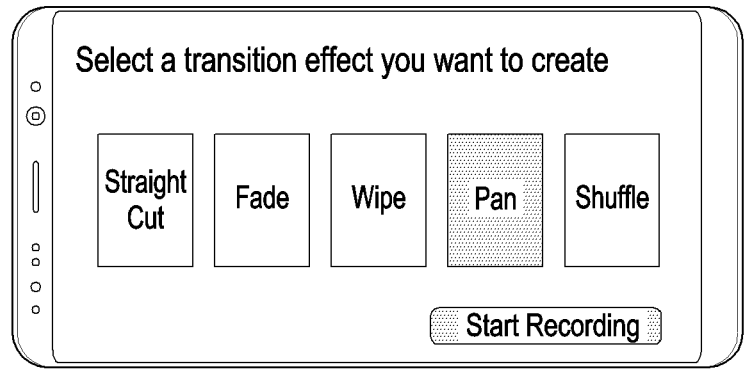

FIGS. 11A, 11B, and 11C illustrate an example of selection of a media type-specific template according to various embodiments of the disclosure.

According to various embodiments, a method of switching to the main camera may use natural interaction based on a user action during a live broadcast. Referring to FIGS. 11A, 11B, and 11C, according to various embodiments, composition of a preferred camera and action (interaction) of a creator that are frequently used for each content type of single-person media may be templated, and the user may select a desired template before media shooting and preferentially configure interaction defined within the corresponding template as a main camera switching reference.

According to various embodiments, when the corresponding interaction is recognized and selected as the main camera, capturing may be performed with a composition defined in the corresponding camera. According to various embodiments, when interactions are complexly recognized, interactions except for the interaction defined within the corresponding template may be selected as the main camera according to a "priority".

Referring to FIG. 11A, templates according to media types such as kids, beauty, cooking, talk show, and sports may be configured. In FIG. 11A, when the user selects a template for cooking, a subject desired for a close up may be selected as in the screen of FIG. 11B. According to various embodiments, as illustrated in FIG. 11C, a switching effect between main cameras (for example, straight cut, fading, wipe, pan, and shuffle) may be selected.

Figure 26:
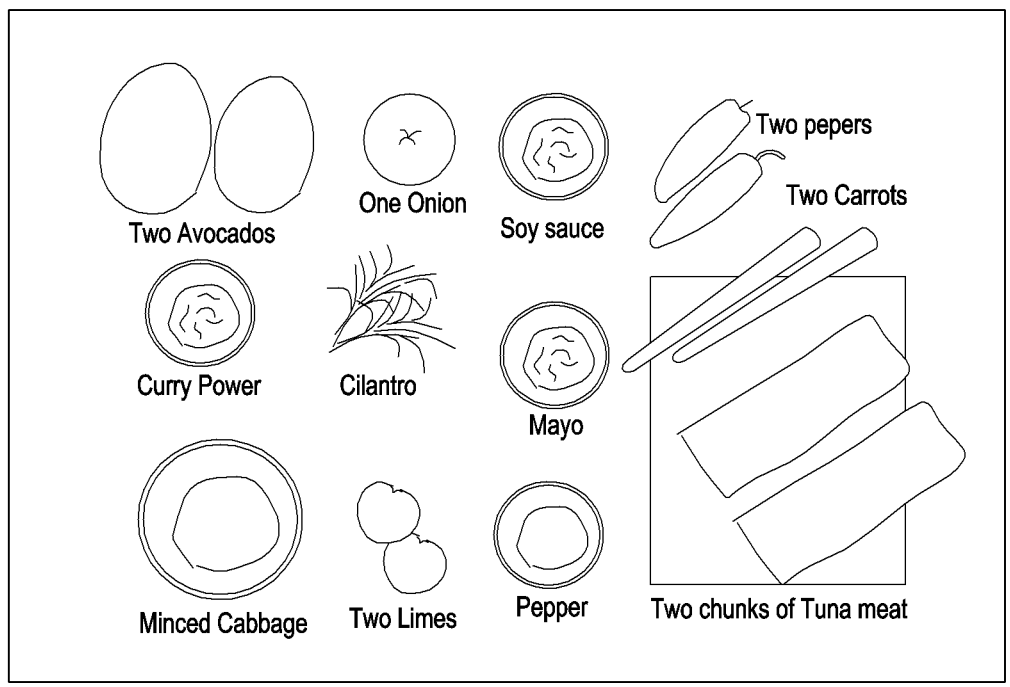
FIG. 26 illustrates an example of image data into which additional information is inserted according to various embodiments of the disclosure.

According to various embodiments, user interaction may use screen-based face recognition, camera motion recognition, and voice recognition. According to various embodiments, default composition of a first camera (for example, a fixed camera) may be configured as full shot, and default composition of a second camera (for example, a hand-held camera) may be configured as close-up shot. According to various embodiments, when a voice command is input, augmented media may display ingredient information as illustrated in FIG. 26 described below.

FIGS. 12A, 12B, 12C, 12D, and 12E illustrate examples of selection of a media type-specific camera according to various embodiments of the disclosure.

Figure 12A:
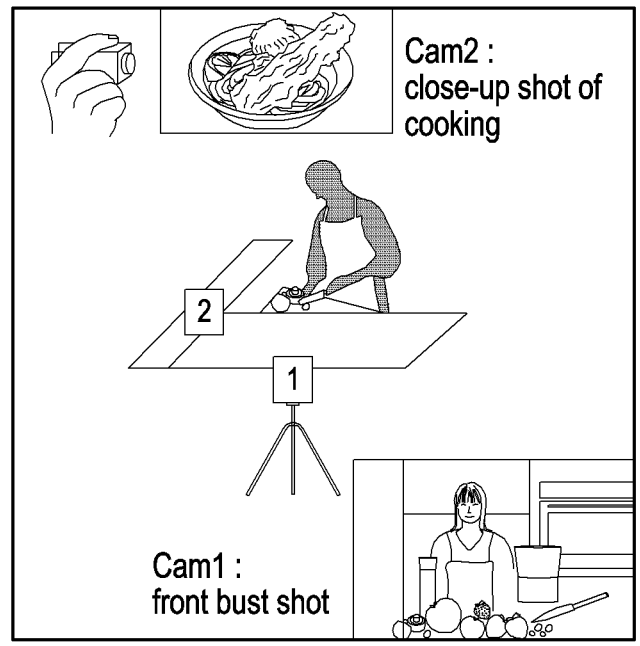
FIGS. 12A, 12B, 12C, 12D, and 12E illustrate examples of selection of a media type-specific camera according to various embodiments of the disclosure.

Referring to FIG. 12A, a cooking-related template may be selected and an action of raising a camera may be configured as representative interaction. According to various embodiments, Cam1 which recognizes a user's face for n seconds may be selected as the main camera and may take a general bust shot of the user. When the user holds Cam2, motion of the camera may be recognized, Cam2 may be switched to the main camera, and a free composition shot which the user desires may be taken in a close-up. When the user puts Cam2 down, the main camera may be switched to Cam1 that is a previous camera.

Figure 12B:
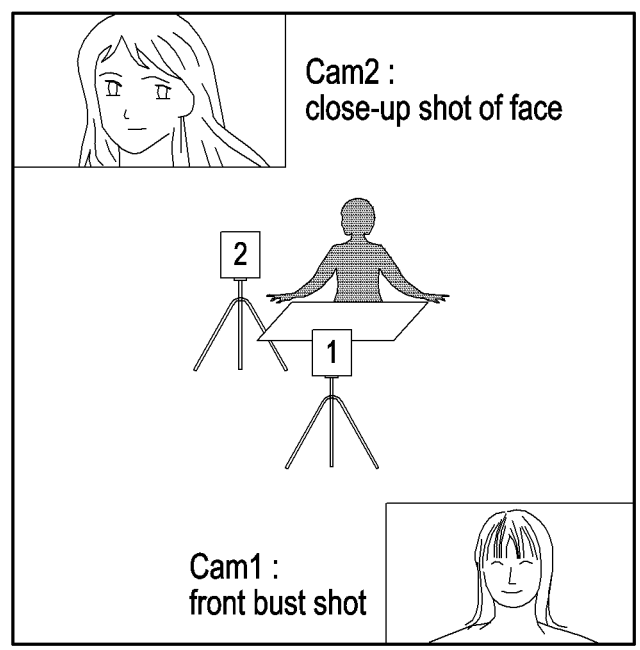

Referring to FIG. 12B, a beauty template may be selected and an action of looking at a camera may be configured as representative interaction. According to various embodiments, Cam1 in front that recognizes a user's face for n seconds through a face recognition technology may be selected as the main camera and a general bust shot of the user may be taken. When the user looks at Cam2 on the side of the user and the user's face is recognized for n seconds, Cam2 may be switched to the main camera. When Cam2 is a camera having a wide-angle function and Cam2 is the main camera, a zoom-in function may be operated according to a preset function and thus the user's face may be taken in a close-up.

Figure 12C:
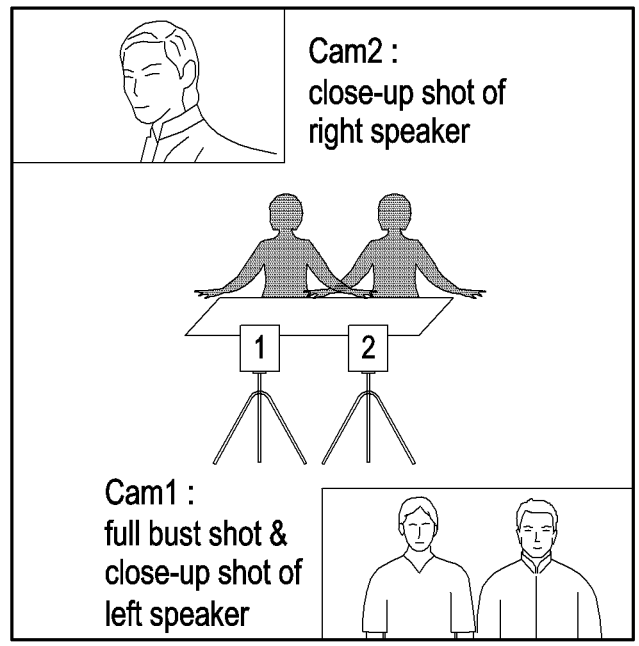

Referring to FIG. 12C, a talk show template may be selected and a talking action may be configured as representative interaction. According to various embodiments, when a plurality of users talk simultaneously or continuously in sequence, one (Cam1) of the two cameras may be selected as the main camera and may take a full shot. When speaking of one user for n seconds or longer is recognized without interruption of another user (for example, when a user speaking with a louder voice is recognized on the basis of comparison between user utterance sizes (for example, decibel levels) input into the microphone), the adjacent camera (Cam2) may switch to the main camera and take a close up of the corresponding user.

Figure 12D:
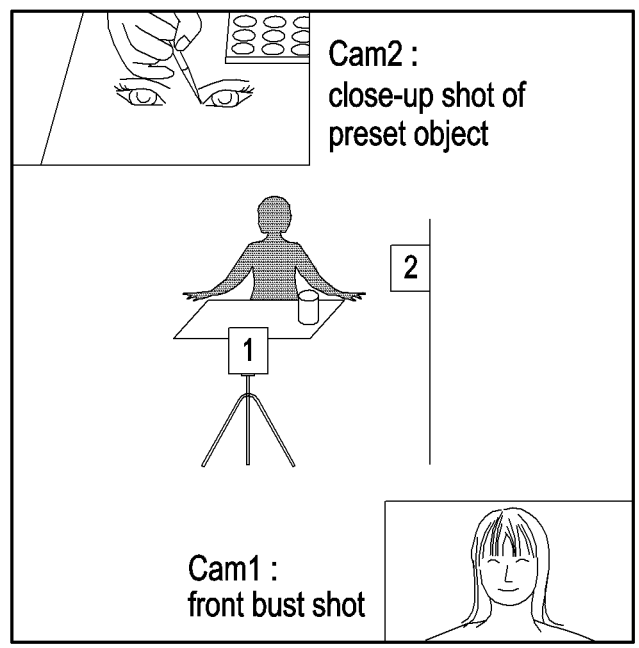

Referring to FIG. 12D, an object-related template (for example, a kid template) may be selected and an action of controlling an object may be configured as representative interaction. According to various embodiments, Cam1 that recognizes a user's face for n seconds may be selected as the main camera and may take a general bust shot of the user. Through recognition of an area configured before capturing or a specific subject (object), if there is movement of controlling or raising an object within the corresponding area for n seconds or longer, Cam2 may be selected as the main camera and Cam2 may take a close-up shot of the corresponding area or the corresponding object.

Figure 12E:
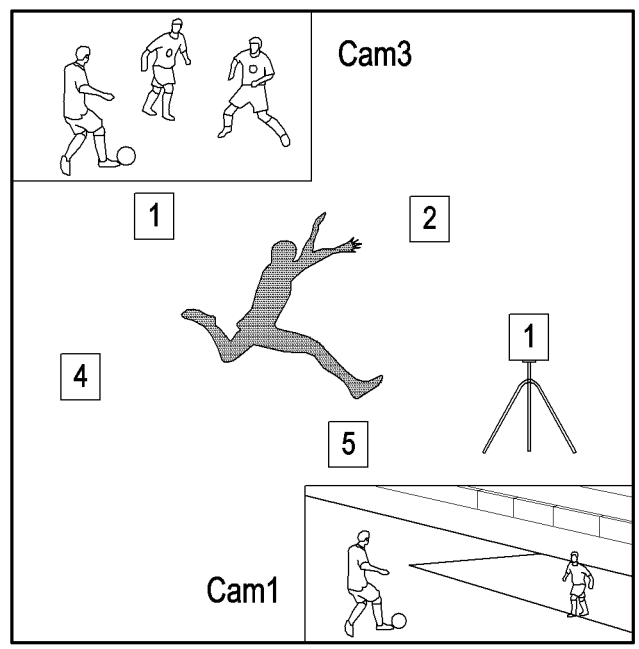

Referring to FIG. 12E, a sports template may be selected, and an action of the user moving may be configured as representative interaction. According to various embodiments, the closest camera can capture a moving main subject (user) through automatic camera switching by detecting a relative distance between the user and each camera on the basis of depth sensing or image (vision) recognition technology. When N cameras are installed, successive actions may be captured in N compositions through automatic main camera switching.

FIGS. 13A, 13B, and 13C illustrate an example of the camera control by a user gesture according to various embodiments of the disclosure.

According to various embodiments, in addition to the method of automatically controlling the camera using the template for each media type, the camera may be controlled (for example, selection of the main camera) through recognition of user gesture interaction during capturing. As illustrated in FIGS. 13A, 13B, and 13C, a camera designated through a gesture may be switched to the main camera according to various embodiments, and camera composition may be controlled through recognition of the gesture.

Referring to FIG. 13A, a camera located in a gesture direction based on a front camera which the user faces may be switched to the main camera. For example, when the user waves his/her hand (or arm) to the left, a camera on the left may be switched to the main camera. When the user waves his/her hand (or arm) to the right, a camera on the right may be switched to the main camera.

Referring to FIG. 13B, according to various embodiments, when the user points at the front camera which the user faces with his/her finger, the corresponding camera may be switched to the main camera. Referring to FIG. 13C, according to various embodiments, when the user takes a pinch-in gesture or a pinch-out gesture with his/her finger toward a front camera which the user faces, the corresponding camera may perform a zoom-in function or a zoom-out function.

Figure 14A:
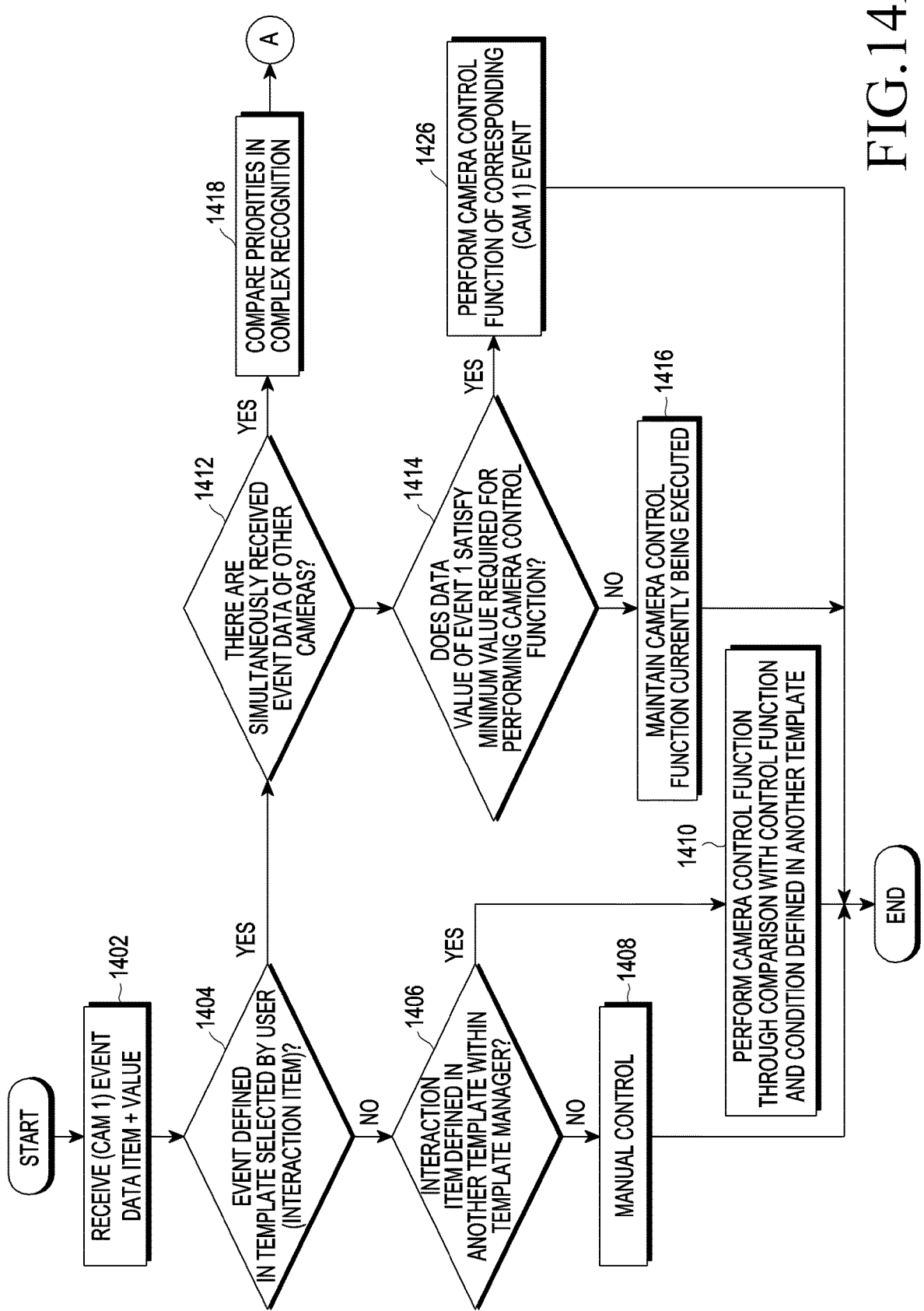
FIGS. 14A and 14B are flowcharts illustrating an example of determining a main camera according to various embodiments of the disclosure.
Figure 14B:
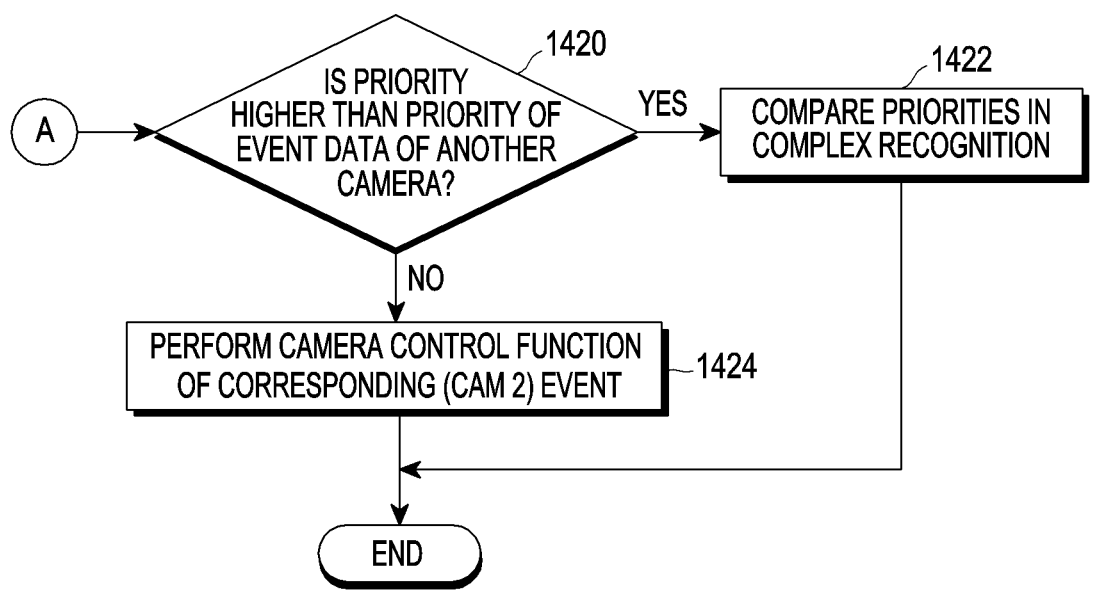

FIGS. 14A and 14B are flowcharts illustrating an example of determining a main camera according to various embodiments of the disclosure. Real-time event data which is transmitted by each camera and received through a data receiver of the cloud server may be transferred to a condition determiner of the cloud server. The condition determiner may compare a type of the received event data with an interaction item defined in a template selected by the user.

When the type of the event data matches the interaction item on the basis of the comparison result, a value of the corresponding event data may be processed and a function defined with the template (for example, a camera control function) may be executed. When the type of the event data does not match the interaction item, comparison with an item of another template within the template manager may be performed. When the item does not match all event types within the occupied template, switching to manual control may be performed.

Referring to FIGS. 14A and 14B, a cloud server (for example, the cloud server 110 of FIG. 1) may receive an event data item and each item value from a first camera in operation 1402. In operation 1404, the cloud server may identify whether the received item and value correspond to an event defined in a template pre-selected by the user.

When the received item and value do not match the event defined in the pre-selected template on the basis of the identification result, the cloud server may determine whether the item and value correspond to an interaction item defined in another template within the template manager in operation 1406. When the item and value do not correspond to the interaction item defined in another template, the cloud server may perform manual control by a user gesture in operation 1408. When the item and value correspond to the interaction item defined in another template, the cloud server may perform a camera control function through comparison with a control function and a condition defined in another template in operation 1410.

When the item and value correspond to the event defined in the pre-selected template on the basis of the identification result of operation 1404, the cloud server may identify whether there is simultaneously received event data of another camera in operation 1412. When there is simultaneously received event data of another camera on the basis of the identification result, the cloud server may compare priorities in preset complex recognition in operation 1418.

The cloud server may determine whether a priority of the camera is higher than a priority of event data of another camera in operation 1420 and, when the priority is higher, perform a camera control function corresponding to the corresponding event for the first camera in operation 1422. When the priority is not higher in operation 1420, the cloud server may perform a camera control function corresponding to the corresponding event for the second camera in operation 1424.

When there is no simultaneously received event data of another data in operation 1412, the cloud server may determine whether a first event data value satisfies a minimum value required for performing the camera control function in operation 1414. When the first event data value satisfies the minimum value on the basis of the determination result, the cloud server may perform the camera control function of the corresponding event for the first camera in operation 1426. When the first event data value does not satisfy the minimum value on the basis of the determination result, the cloud server may maintain the camera control function that is currently performed in operation 1416.

According to various embodiments, the control of a camera for each interaction type may be used through definition of [Table 1], but embodiments of the disclosure are not limited to the following table.

Figure 15:
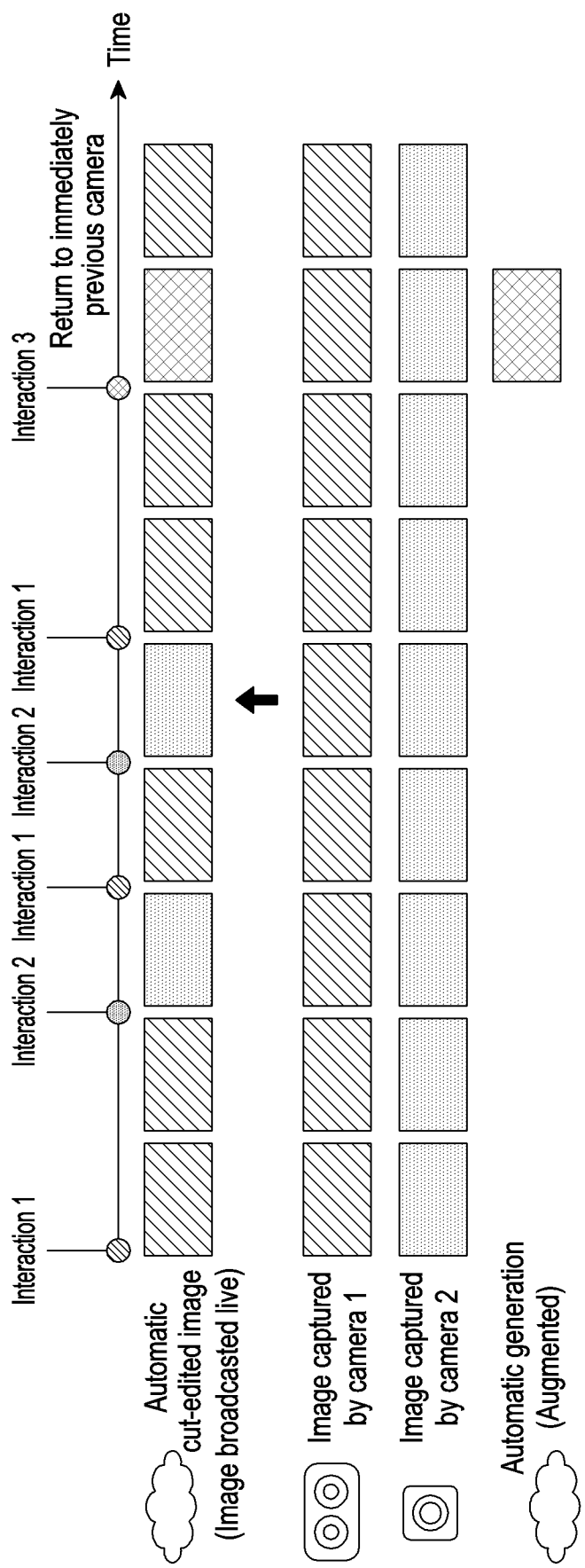
FIGS. 15 and 16 illustrate an example of a method of editing real-time image data according to various embodiments of the disclosure.
Figure 16:
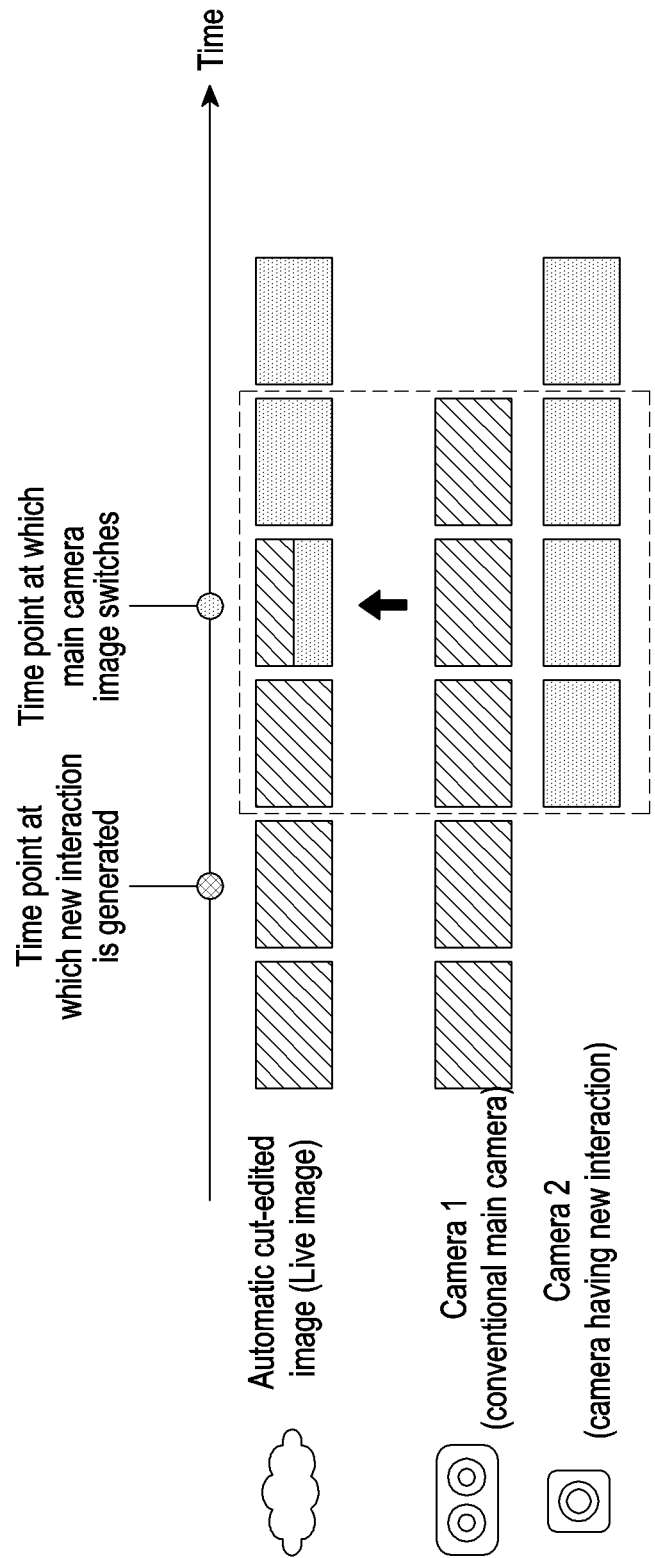

FIGS. 15 and 16 illustrate an example of a method of editing real-time image data according to various embodiments of the disclosure. Referring to FIG. 15, one camera switching to the main camera may transmit a captured image to the cloud server in real time, and the cloud server may connect images received right before and generate automatically cut-edited media in real time. An image captured before the main camera switches to another camera according to recognition of new user interaction may be transmitted from the corresponding camera to the cloud server.

The cloud server may connect images received from each main camera in chronological order and generate automatically cut-edited media. The generated cut-edited image may be broadcasted in real time through a real-time broadcasting server, and the broadcasted image data in real time may be stored in the cloud server.

In the standby-multi or standby-single state after capturing ends, the cloud server may store the automatically cut-edited image data in a memory or storage as a final cut-edited image.

The user may log in from a device (for example, a smart phone or a PC) having a display with an account of the cloud server, identify the automatically cut-edited image and all image data captured by each camera, and additionally edit the same as necessary.

Referring to FIG. 15, one piece of image data captured by a first camera and image data captured by a second camera may be selected according to an interaction and automatically cut-edited. For example, image data captured by the first camera may be broadcasted as an automatically cut-edited image according to an interaction (Interaction 1) of selecting the first camera as the main camera, and image data captured by the second camera may be broadcasted as an automatically cut-edited image according to an interaction (Interaction 2) of selecting the second camera as the main camera. When a third interaction (Interaction 3) is generated, an augmented image may be automatically generated rather than the image data captured by the first camera or the second camera and may be included as the cut-edited image.

Referring to FIG. 16, according to various embodiments, since an image may be disconnected due to various conditions such as a transmission delay during determination and switching of a main camera by the cloud server after generation of user interaction, an image transmitted from

TABLE 1

| Input (interaction type) | Output (camera control) | Note |
|---|---|---|
| Voice command | Perform control function corresponding to corresponding command<br>For example, "Zoom in here" → perform zoom-in function<br>For example, "Show me cooking ingredients" → augment cooking ingredients | All templates linked to Bixby Voice |
| Voice size (decibel) | Main camera switching and close up | Talk Show template |
| Front face recognition (for n seconds) | Main camera switching and distant view capturing | All templates |
| Camera location change (raise camera) | Main camera switching and distant view capturing | Cooking, Outdoor templates |
| User movement and distance between user and camera | Main camera switching and distant view capturing | Sport template |
| Face recognition + hand/arm gesture | Perform control function corresponding to hand/arm gesture | Manual control |
| Face recognition + finger gesture | Perform control function corresponding to finger gesture | Manual control | another camera may be naturally switched according to a method illustrated in FIG. 16.

According to various embodiments, each camera may continuously upload all images to the cloud server, and the cloud server may selectively transmit an image of the newly switched main camera at a main camera switching time point.

According to various embodiments, as illustrated in FIG. 16, before and after a time point at which camera switching is needed due to generation of a user interaction, images may be received from all cameras and stored in a buffer. Further, the user may apply a pre-selected transition effect to complete image switching and disconnect reception of the conventional main camera after the image of the new main camera is transmitted.

Figure 17:
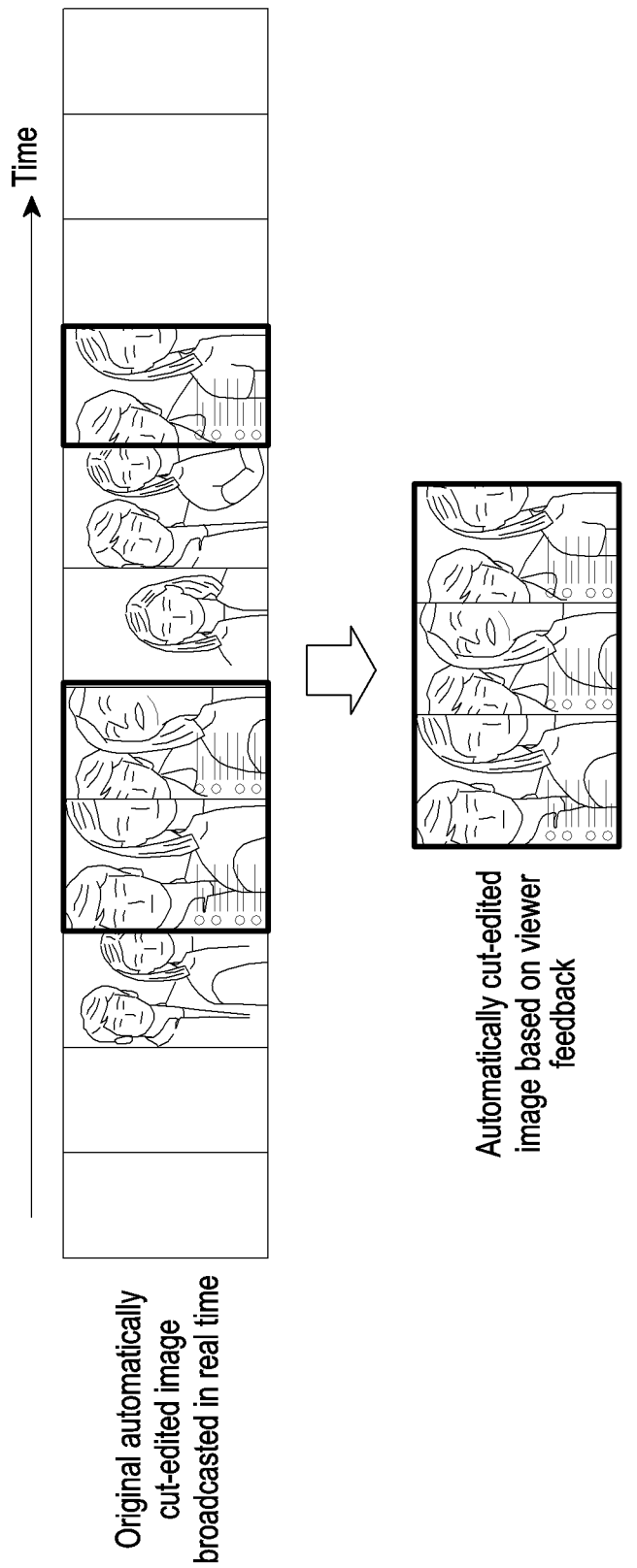
FIG. 17 illustrates a method of additionally editing generated image data according to various embodiments of the disclosure.

FIG. 17 illustrates a method of additionally editing generated image data according to various embodiments of the disclosure. Referring to FIG. 17, when a replay image is uploaded after a real-time broadcast, image data may be additionally cut-edited to reduce the length of image data and perform reprocessing to impact media according to various embodiments.

According to various embodiments, the cloud server may receive an automatically cut-edited image transmitted from an account-linked service platform (for example, a real-time broadcasting server) and user feedback (replies, emotions, and stickers) data uploaded in real time. The cloud server may detect or identify images having many user feedbacks, automatically cut-edit only the corresponding part, and reprocess the part to be an image to be uploaded.

Figure 18:
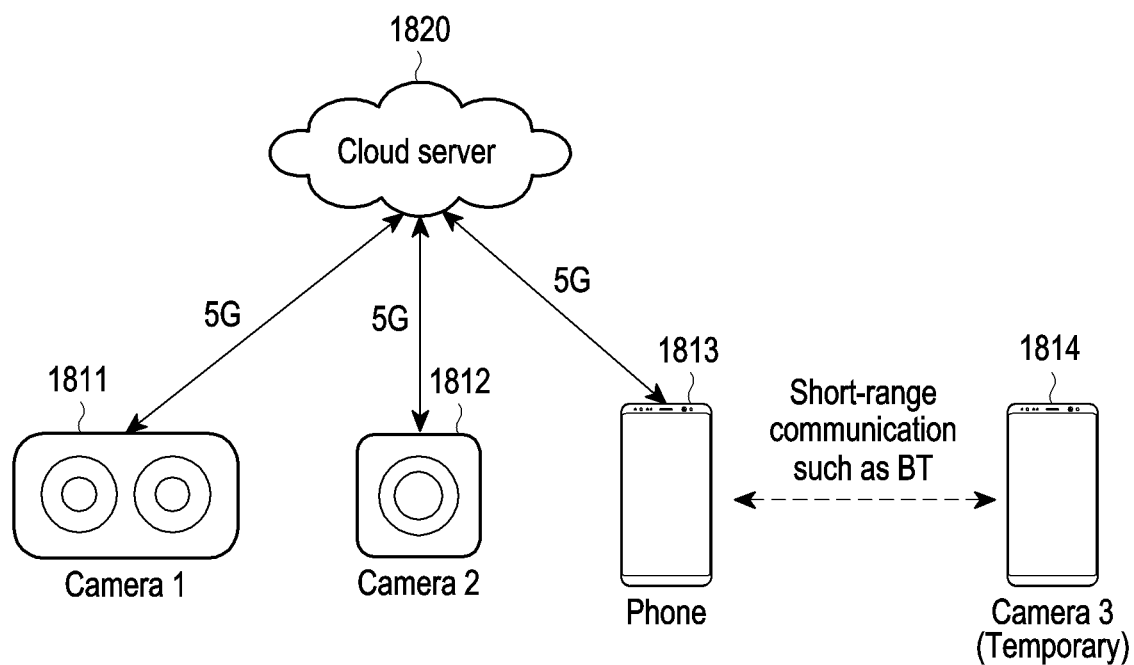
FIG. 18 illustrates a new registration method of the electronic device according to various embodiments of the disclosure.

FIG. 18 illustrates a new registration method of the electronic device according to various embodiments of the disclosure. Referring to FIG. 18, a camera or a smart phone of another person may be temporarily added to a multi-camera network.

According to various embodiments, a first camera 1811, a second camera 1812, and a smart phone 1813 of the user may be connected to a cloud server 1820 through a public mobile network. According to various embodiments, when a new third camera 1814 is added to an account of the user, the connection may be made through short-range communication modules embedded into the smart phone 1813 and the third camera 1814.

Figure 19:
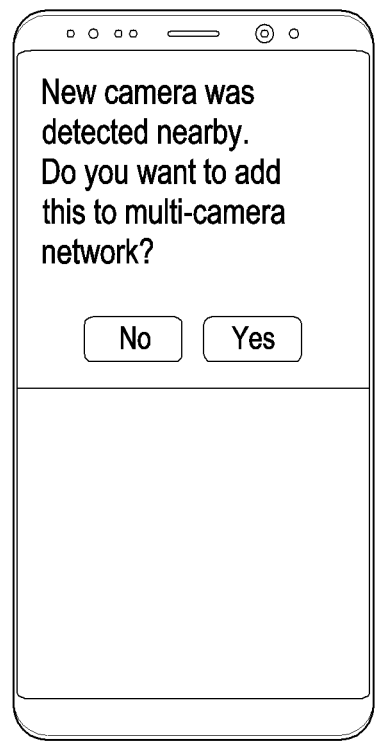
FIG. 19 illustrates an example of a screen displayed in a linked electronic device when the electronic device is newly registered according to various embodiments of the disclosure.
Figure 20:
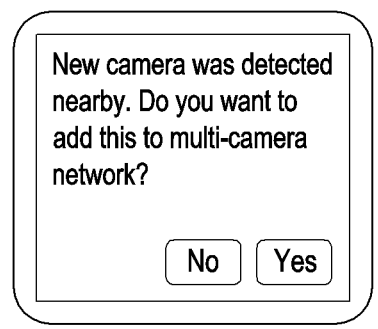
FIG. 20 illustrates an example of a screen displayed in a camera according to various embodiments of the disclosure.

When the smart phone 1813 and the third camera 1814 are connected through the embedded short-range communication modules, a message (notification) asking about whether to add a new camera to the multi-camera network may be provided to the user through a display of the conventional camera 1811 or 1812, or the linked smart phone 1813 as illustrated in FIGS. 19 and 20. In the screen of FIG. 19 or 20, when user approval is acquired through selection of "YES", the new user camera 1814 may be temporarily added to the cloud account in which the conventional cameras are registered and may be used for generating media along with other conventional cameras.

FIG. 19 illustrates an example of the screen displayed in an electronic device (for example, a smart phone) linked when the electronic device is newly registered according to various embodiments of the disclosure, and FIG. 20 illustrates an example of the screen displayed in a camera according to various embodiments of the disclosure.

Figure 21:
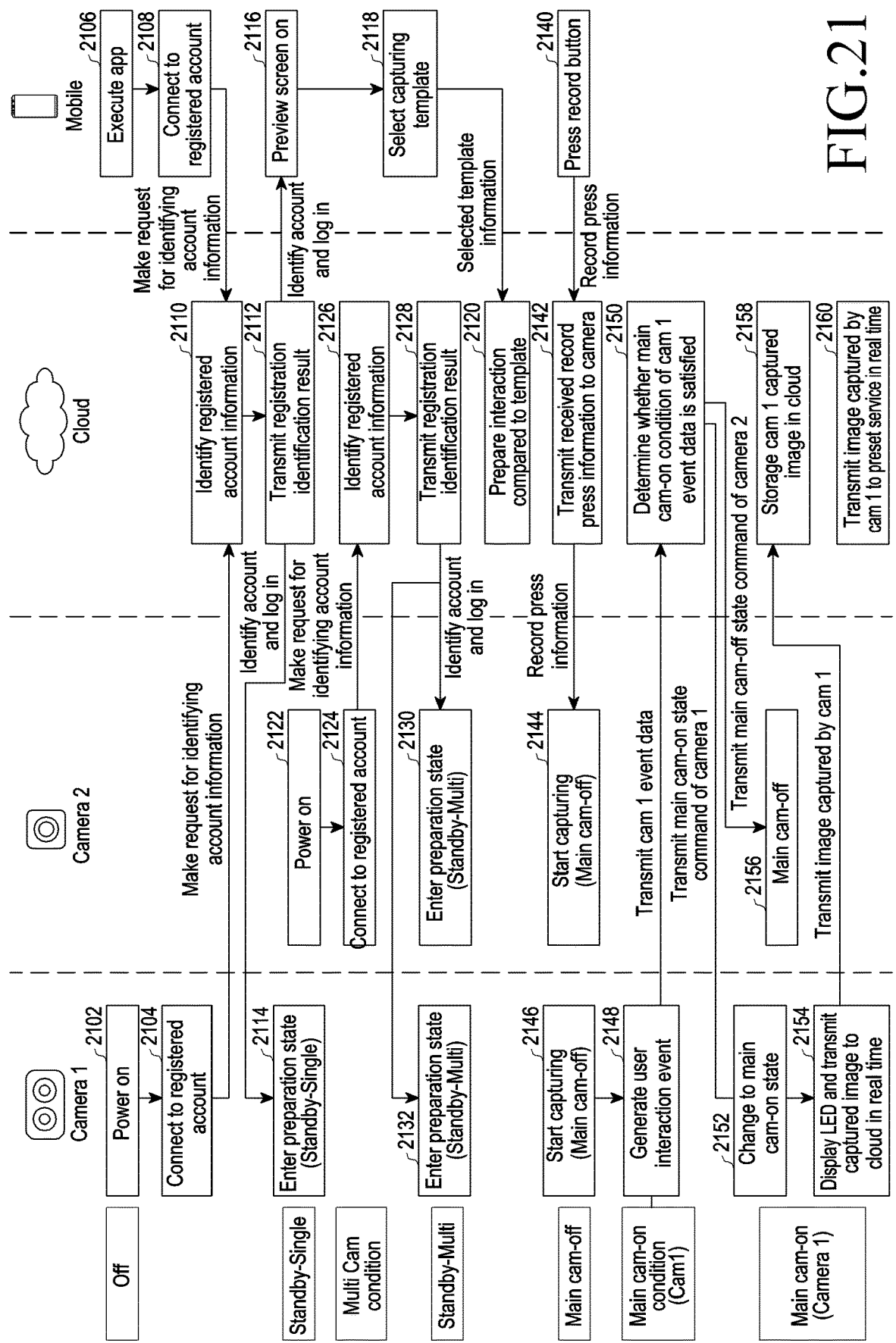
FIGS. 21 and 22 are flowcharts illustrating an image data service procedure through a plurality of cameras according to various embodiments of the disclosure.
Figure 22:
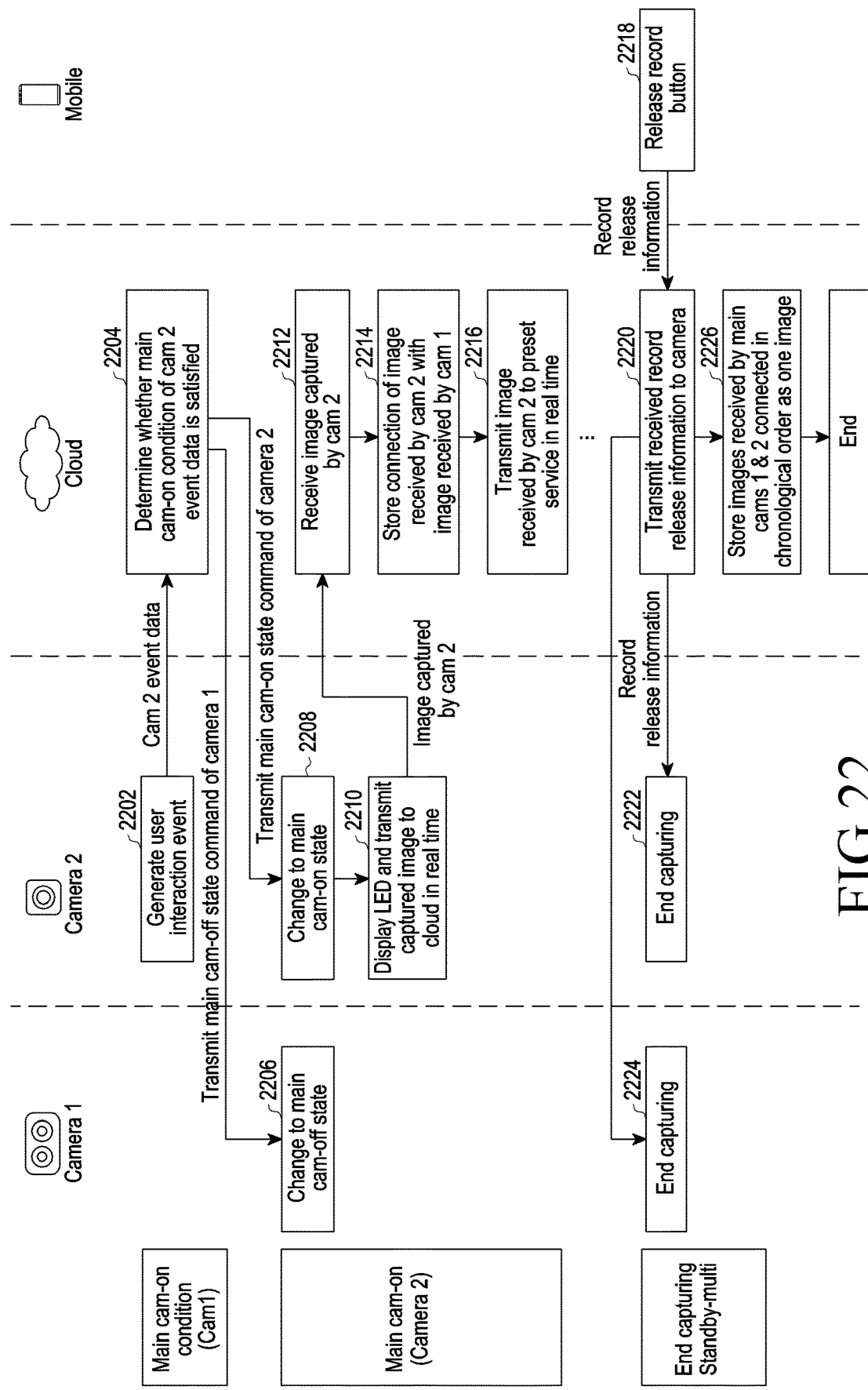

FIGS. 21 and 22 are flowcharts illustrating an image data service procedure through a plurality of cameras according to various embodiments of the disclosure.

Referring to FIG. 21, power of a first camera is turned on in operation 2102, and a registered account may be connected to a cloud server to make a request for identifying account information to the cloud server in operation 2104. The user may execute an application through the electronic device in operation 2106 and make the connection through the account registered in the cloud server in operation 2108.

The cloud server may identify registered account information in operation 2110, and transmit the registration identification result to the first camera or the electronic device in operation 2112. In operation 2114, the first camera may enter a preparation state and be in a standby-single state. In operation 2116, the electronic device may turn on a preview screen. The user may select a capturing template through the screen of the electronic device in operation 2118. The selected template information may be transmitted to the cloud server, and the cloud server may prepare a determination of interaction corresponding to the received template in operation 2120.

Power of the second camera may be turned on in operation 2122, and the registered account may be connected to the cloud server to make a request for identifying account information to the cloud server in operation 2124. The cloud server may identify registered account information in operation 2126, and transmit the registration identification result to the second camera in operation 2128. In operation 2130, the second camera may enter a preparation state and be in a standby-single state.

When the user presses a recording button of the electronic device to initiate capturing in operation 2140, capturing initiation information (or recording button press information) may be transmitted to the cloud server. The cloud server may transmit the received capturing initiation information (or recording button press information) to each camera in operation 2142, and the second camera and the first camera may switch to a main camera-off state and initiate capturing in operation 2144 and operation 2146.

When a user interaction event is generated by the first camera in operation 2148, event data of the first camera may be transmitted to the cloud server. The cloud server may receive the event data from the first camera and determine whether a main camera condition is satisfied in operation 2150. When the first camera satisfies the main camera condition on the basis of the determination result, the cloud server may transmit a main camera-on state command to the first camera and transmit a main camera-off state command to the second camera.

The first camera may be configured as the main camera-on state in operation 2152, and the second camera may be configured as the main camera-off state in operation 2156. In operation 2154, the first camera may display an LED indication in accordance with the main camera and transmit captured image data to the cloud server in real time.

The cloud server may store image data transmitted from the first camera in operation 2158, and transmit the captured image data of the first camera to a configured service (for example, a real-time broadcasting server) in real time in operation 2160.

Referring to FIG. 22, when a user interaction event is generated by the second camera in operation 2202, event data of the second camera may be transmitted to the cloud server. The cloud server may receive the event data from the second camera and determine whether a main camera condition is satisfied in operation 2204. When the second camera satisfies the main camera condition on the basis of the determination result, the cloud server may transmit a main camera-on state command to the second camera and transmit a main camera-off state command to the first camera.

The first camera may switch to the main camera-off state in operation 2206, and the second camera may be configured as the main camera-on state in operation 2208. In operation 2210, the second camera may display an LED indication in accordance with the main camera and transmit captured image data to the cloud server in real time.

The cloud server may store image data transmitted from the second camera in operation 2212, and may connect the received image of the first image to the received image of the second camera and store the connected images in operation 2214. In operation 2216, the cloud server may transmit captured image data of the second camera to a configured service (for example, a real-time server) in real time.

When the user presses a capturing stop button of the electronic device in operation 2218, information on capturing stop may be transmitted to the cloud server. The cloud server may receive the information on capturing stop from the electronic device, and may transmit the information on capturing stop to the first camera and the second camera in operation 2220.

In operation 2224 and operation 2222, the first camera and the second camera may receive the information on capturing stop from the cloud server and end the capturing, and may switch to a standby-multi state. In operation 2226, the cloud server may store received images of main cameras 1 and 2 connected in chronological order as one image.

Figure 23:
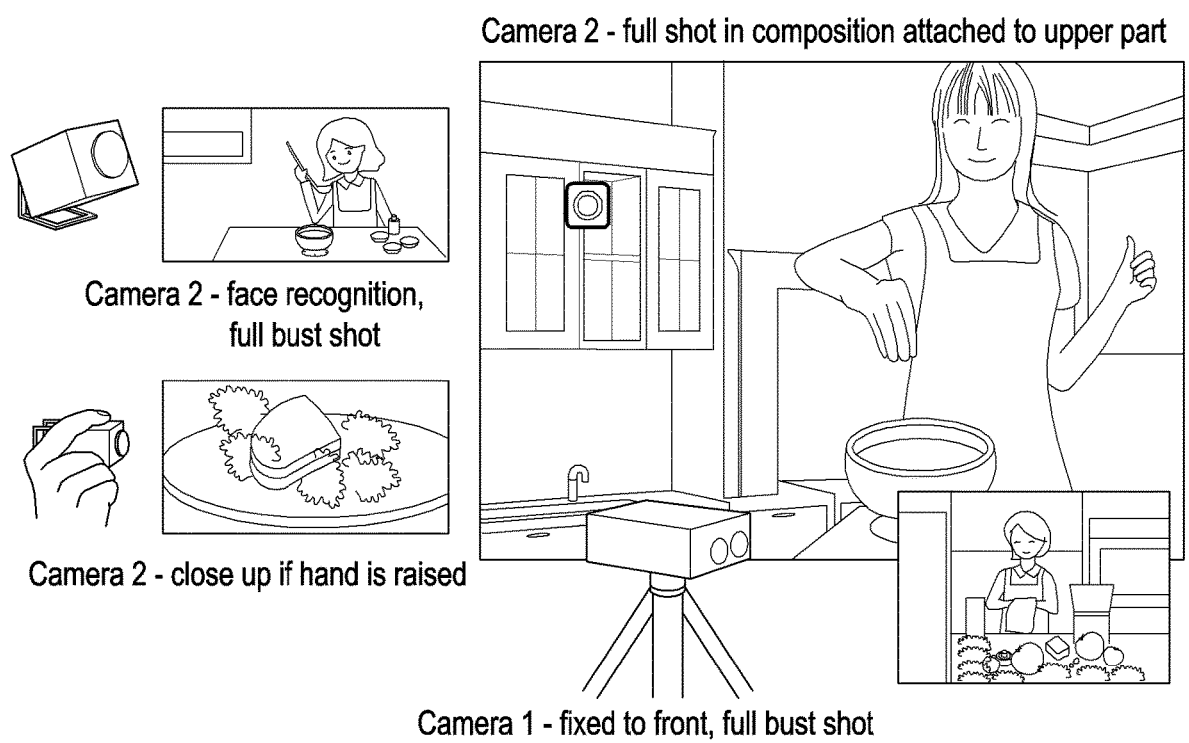

FIGS. 23 and 24 illustrate examples of automatically switching composition between a plurality of cameras according to various embodiments of the disclosure. Referring to FIG. 23, according to various embodiments, as an example of a cooking broadcast, automatic composition switching between a fixed camera and a hand-held camera may be performed.

When a first camera (Camera 1) is fixed to a front surface of an ingredient preparation part and a second camera (Camera 2) is installed on an upper part of a cooking part, the cloud server may automatically edit image data according to the following conditions according to various embodiments.

1. First camera (condition of "look at the camera" is satisfied): say hello and introduce preparation of ingredients while looking at the first camera when a broadcast starts (record press).

2. Second camera (condition of "look at the camera" is satisfied): move to the cooking part and introduce a cooking method while looking at the second camera.

3. Second camera (condition of "raise the camera" is satisfied): raise the second camera and close up cooking.
   <Template Configuration—Cooking Broadcast>
   User interaction: face recognition, camera motion recognition, and voice recognition
   Default component of a first camera (for example, a fixed camera): full shot
   Default composition of a second camera (for example, a hand-held camera): close-up shot
   Augmented media: display ingredient information (when a voice command is input)

Referring to FIG. 24, automatic composition switching may be performed between the fixed camera and the hand-held camera. When the first camera is fixed to a handlebar of a bicycle and the second camera is held by a dad, the following operations may be performed according to various embodiments.

Figure 25:
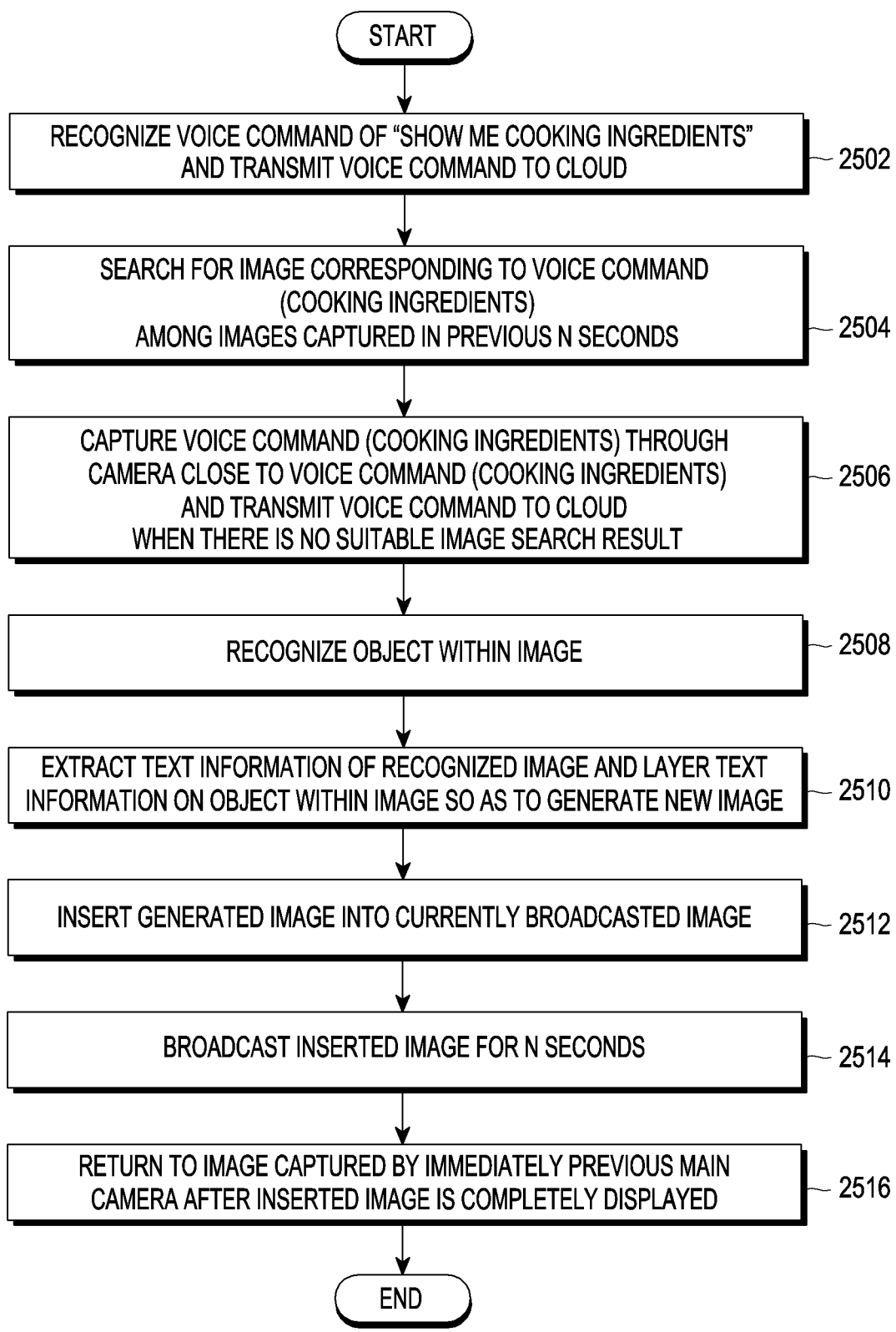
FIG. 25 illustrates an example of inserting additional information into image data in real time according to various embodiments of the disclosure.

1. First camera (condition of "look at the camera" is satisfied): take a bust shot of a kid when a broadcast starts 2. Second camera (condition of "lift the camera" is satisfied): dad lifts the camera and remotely captures the kid riding a bicycle 3. First camera (condition of "say something" is satisfied): when the kid loudly shouts with great joy, switching to the first camera is performed and a close up of the face is taken
   <Template Configuration>
   User interaction: face recognition, camera motion recognition, and voice recognition
   Default composition of a first camera (for example, a fixed camera): close-up shot
   Default composition of a second camera (for example, a hand-held camera): full shot FIGS. 25 and 26 illustrate an example of inserting additional information to image data in real time according to various embodiments of the disclosure. According to various embodiments, when the user makes a voice command, the voice command may be transmitted to the cloud server, and the cloud server may recognize a relevant object within an image, layer relevant additional information in real time, and edit the image data.

Referring to FIG. 25, in operation 2502, the voice command may be recognized and transmitted to the cloud server. In operation 2504, an image corresponding to the voice command may be searched for in images captured in the previous N seconds. When there is no suitable image search result, a camera close to the voice command may capture the voice command and transmit the same to the cloud server in operation 2506.

The object within the image may be recognized in operation 2508, text information of the recognized image may be extracted in operation 2510, and a new image may be generated by overlappingly displaying objects within the image as illustrated in FIG. 26. The generated image data may be inserted in a currently broadcasted image in operation 2512, and the inserted image may be transmitted as broadcasting data for n seconds in operation 2514. In operation 2516, after reproduction of the inserted image is completed, the captured image of the previous main camera may be returned to.

Figure 27:
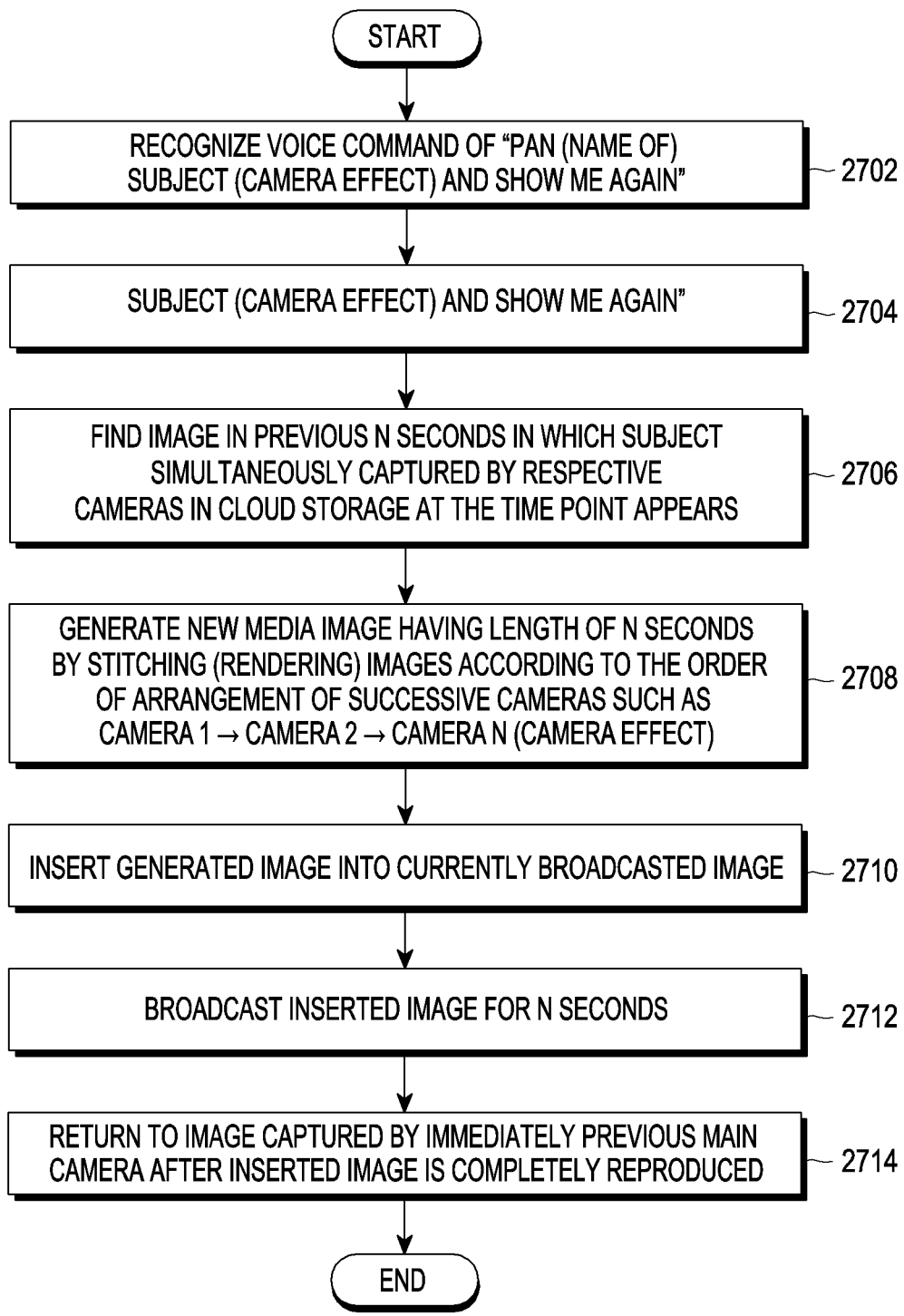
FIG. 27 illustrates an example of inserting an additional image into image data in real time according to various embodiments of the disclosure.

FIG. 27 illustrates an example of inserting additional information to image data in real time according to various embodiments of the disclosure. Referring to FIG. 27, when a voice command is recognized in operation 2702, the voice command may be transmitted to the cloud server in operation 2704.

In operation 2706, the cloud server may search for an image in the previous N seconds in which a subject, captured by respective cameras at the same time point, simultaneously appears. In operation 2708, a new media image having the length of n seconds may be generated by stitching images through the application of a camera effect according to the order of arrangement of successive cameras.

The generated image data may be inserted in a currently broadcasted image in operation 2710, and the inserted image may be transmitted as broadcasting data for n seconds in operation 2712. In operation 2714, after reproduction of the inserted image is completed, the captured image of the previous main camera may be returned to.

Hereinafter, the electronic device according to various embodiments will be described with reference to the accompanying drawings. In this document, the term "user" may refer to a person using an electronic device or a device using an electronic device (for example, an artificial intelligence device).

FIG. 28 is a block diagram of an electronic device 2801 (for example, the first camera 121, the second camera 122, the electronic device 123, and the cloud server 110 of FIG. 1) within a network environment 2800 according to various embodiments. Referring to FIG. 28, in the network environment 2800, the electronic device 2801 may communicate with an electronic device 2802 through a first network 2898 (for example, short-range wireless communication) and communicate with an electronic device 2804 or a server 2808 through a second network 2899 (for example, long-range wireless communication). According to an embodiment, the electronic device 2801 may communicate with the electronic device 2804 through the server 2808. According to an embodiment, the electronic device 2801 may include a processor 2820, a memory 2830, an input device 2850, a sound output device 2855, a display device 2860, an audio module 2870, a sensor module 2876, an interface 2877, a haptic module 2879, a camera module 2880, a power management module 2888, a battery 2889, a communication module 2890, a subscriber identification module 2896, and an antenna module 2897. According to some embodiments, at least one of the elements (for example, the display device 2860 or the camera module 2880) may be omitted or another element may be added to the electronic device 2801. According to some embodiments, for example, like the case of the sensor module 2876 (for example, a fingerprint sensor, an iris sensor, or an illumination sensor) embedded into the display device 2860 (for example, a display), some elements may be integrated.

The processor 2820 may execute, for example, software (for example, a program 2840) to control at least one other element (for example, hardware or software element) of the electronic device 2801 connected to the processor 2820 and perform various data processings and calculations. The processor 2820 may load a command or data received from another element (for example, the sensor module 2876 or the communication module 2890) to a volatile memory 2832, process the command or data, and store the resultant data in the nonvolatile memory 2834. According to an embodiment, the processor 2820 may include a main processor 2821 (for example, a central processing unit or an application processor) and an auxiliary processor 2823 (for example, a graphic processing unit, an image signal processor, a sensor hub processor, or a communication processor) which operates independently from the main processor 2821 and additionally uses substantially lower power than the main processor 2821 or is specified for a predetermined function. The auxiliary processor 2823 may operate separately from the main processor 2821 or in the state of being embedded into the main processor 2821.

In this case, the auxiliary processor 2823 may control at least some of the functions or states related to at least one of the elements of the electronic device 2801 (for example, the display device 2860, the sensor module 2876, or the communication module 2890) instead of the main processor 2821 while the main processor 2821 is in an inactive (for example, sleep) state or together with the main processor 2821 while the main processor 2821 is in an active (for example, application-executed) state. According to an embodiment, the auxiliary processor 2823 (for example, image signal processor or communication processor) may be implemented as some of other functionally related elements (for example, the camera module 2880 or the communication module 2890). The memory 2830 may store various pieces of data used by at least one element of the electronic device 2801 (for example, the processor 2820 or the sensor module 2876), for example, software (for example, the program 2840) and input data or output data on a command related thereto. The memory 2830 may include volatile memory 2862 or nonvolatile memory 2864.

The program 2840 is software stored in the memory 2830, and may include, for example, an operating system 2842, middleware 2844, or applications 2846.

The input device 2850 is a device for receiving a command or data to be used by an element of the electronic device 2801 (for example, the processor 2820) from the outside (for example, the user) of the electronic device 2801 and may include, for example, a microphone, a mouse, or a keyboard.

The sound output device 2855 is a device for outputting a sound signal to the outside of the electronic device 2801, and may include, for example, a speaker used for general purposes, such as multimedia reproduction or recording reproduction, and a receiver dedicated to receiving calls. According to an embodiment, the receiver may be formed integratedly with or separately from the speaker.

The display device 2860 is a device for providing visual information to the user of the electronic device 2801, and may include, for example, a display, a hologram device, or a projector and a control circuit for controlling a corresponding device. According to an embodiment, the display device 2860 may include touch circuitry or a pressure sensor for measuring the intensity of pressure of a touch.

The audio module 2870 may bilaterally convert sound and an electronic signal. According to an embodiment, the audio module 2870 may acquire a sound through the input device 2850 or output a sound through the sound output device 2855 or an external electronic device (for example, the electronic device 2802 (for example, a speaker or a headphone)) wirelessly or wiredly connected to the electronic device 2801.

The sensor module 2876 may generate an electrical signal or a data value corresponding to an internal operation state of the electronic device (for example, power or temperature) or an external environment state. The sensor module 2876 may include, for example, a gesture sensor, a gyro sensor, an atmospheric pressure sensor, a magnetic sensor, an acceleration sensor, a grip sensor, a proximity sensor, a color sensor, an Infrared (IR) sensor, a biometric sensor, a temperature sensor, a humidity sensor, or an illumination sensor.

The interface 2877 may support a predetermined protocol which can be wiredly or wirelessly connected to an external electronic device (for example, the electronic device 2802). According to an embodiment, the interface 2877 may include a High-Definition Multimedia Interface (HDMI), a Universal Serial Bus (USB) interface, an SD card interface, or an audio interface.

A connection terminal 2878 may include a connector, which can physically connect the electronic device 2801 with an external electronic device (for example, the electronic device 2802), for example, an HDMI connector, a USB connector, an SD card connector, or an audio connector (for example, a headphone connector).

The haptic module 2879 may convert an electric signal into mechanical (for example, vibration or motion) or electrical stimulation that the user can recognize through the sense of touch or the sense of movement. The haptic module 2879 may include, for example, a motor, a piezoelectric element, or an electro-stimulator.

The camera module 2880 may capture a still image and a moving image. According to an embodiment, the camera module 2880 may include one or more lenses, an image sensor, an image signal processor, or a flash.

The power management module 2888 is a module for managing power supplied to the electronic device 2801, and may be configured as, for example, at least part of a Power Management Integrated Circuit (PMIC).

The battery 2889 is a device for supplying power to at least one element of the electronic device 2801, and may include, for example, a primary cell, which is not rechargeable, a secondary cell, which is rechargeable, or a fuel cell.

The communication module 2890 may establish a wired or wireless communication channel between the electronic device 2801 and an external electronic device (for example, the electronic device 2802, the electronic device 2804, or the server 2808) and support communication through the established communication channel. The communication module 2890 may include one or more communication processors which operate independently from the processor 2820 (for example, an application processor) and support wired communication or wireless communication. According to an embodiment, the communication module 2890 may include a wireless communication module 2892 (for example, a cellular communication module, a short-range wireless communication module, or a Global Navigation Satellite System (GNSS) communication module) or a wired communication module 2894 (for example, a Local Area Network (LAN) communication module or a power-line communication module), and may communicate with an external electronic device through a first network 2898 (for example, a short-range communication network such as Bluetooth, Wi-Fi direct, or Infrared Data Association (IrDA)) or a second network 2899 (for example, a long-distance communication network such as a cellular network, Internet, or a computer network (for example, a LAN or a WAN)) using one of the communication modules. The various types of communication modules 2890 may be implemented as a single chip or as separate chips.

According to an embodiment, the wireless communication module 2892 may identify and authenticate the electronic device 2801 within the communication network using user information stored in the subscriber identification module 2896.

The antenna module 2897 may include one or more antennas for transmitting a signal or power to the outside or receiving a signal or power from the outside. According to an embodiment, the communication module 2890 (for example, the wireless communication module 2892) may transmit a signal to an external electronic device through an antenna suitable for a communication scheme or receive a signal from an external electronic device.

Some of the elements may be connected to each other through a communication scheme between peripheral devices (for example, a bus, General Purpose Input/Output (GPIO), a Serial Peripheral Interface (SPI), or a Mobile Industry Processor Interface (MIPI)) and exchange signals (for example, instructions or data) therebetween.

According to an embodiment, a command or data may be transmitted or received between the electronic device 2801 and the external electronic device 2804 through the server 2808 connected to the second network 2899. Each of the electronic devices 2802 and 2804 may be a device which is the same type as or a different type from that of the electronic device 2801. According to an embodiment, all or some of the operations executed by the electronic device 2801 may be executed by another or a plurality of external electronic devices. According to an embodiment, when the electronic device 2801 is required to perform any function or service automatically or in response to a request, the electronic device 2801 may make a request for at least some functions related to the function or service to an external electronic device instead of or additionally executing the function or service by itself. The external electronic device receiving the request may execute a requested function or an additional function and transmit the result thereof to the electronic device 2801. The electronic device 2801 may provide the received result as it is, or may additionally process the received result to provide the requested functions or services. To this end, for example, cloud computing, distributed computing, or client-server computing technology may be used.

Figure 29:
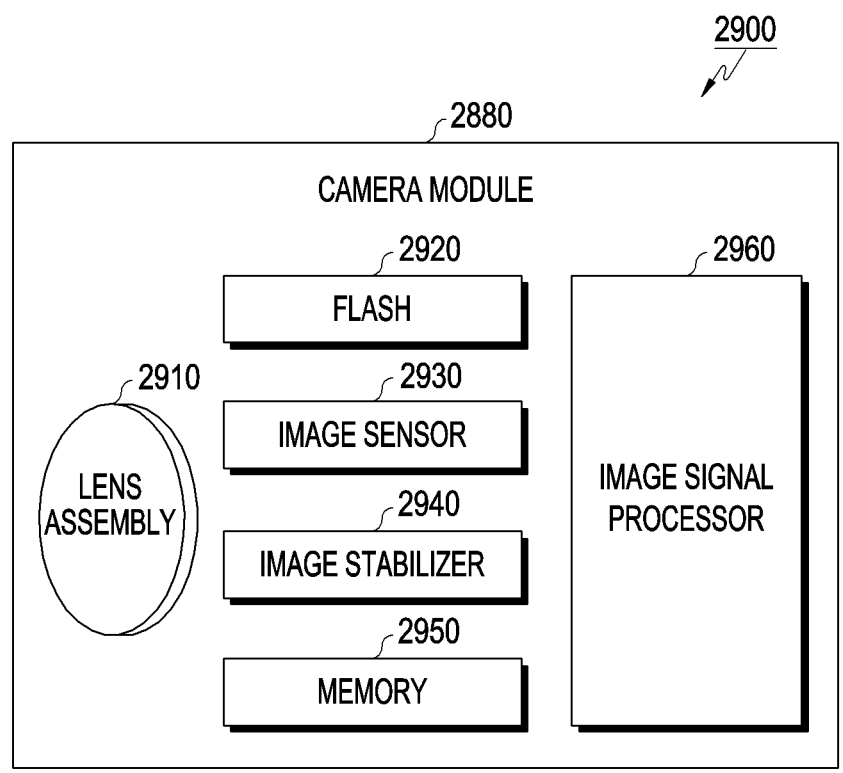
FIG. 29 illustrates a detailed structure of a camera module according to an embodiment of the disclosure.

FIG. 29 is a block diagram 2900 of the camera module 2880 according to various embodiments. Referring to FIG. 29, the camera module 2880 (for example, the first camera 121, the second camera 122, and the electronic device 123 of FIG. 1) may include a lens assembly 2910, a flash 2920, an image sensor 2930, an image stabilizer 2940, a memory 2950 (for example, a buffer memory), or an image signal processor 2960. The lens assembly 2910 may assemble light radiated from a subject of which an image is captured. The lens assembly 2910 may include one or more lenses. According to an embodiment, the camera module 2880 may include a plurality of lens assemblies 2910. In this case, the camera module 2880 may be, for example, a dual camera, a 360-degree camera, or a spherical camera. The plurality of lens assemblies 2910 may have the same lens attributes (for example, a viewing angle, a focal distance, an automatic focus, an f number, or optical zoom), or at least one lens assembly may have at least one different lens attribute from another lens assembly. The lens assembly 2910 may include, for example, a wide-angle lens or a telephoto lens. The flash 2920 may radiate a light source used to enhance light emitted from the subject. The flash 2920 may include one or more light emitting diodes (red-green-blue (RGB)), LED, white LED, infrared LED, or ultraviolet LED), or a xenon lamp.

The image sensor 2930 may acquire an image corresponding to the subject by converting light transmitted from the subject through the lens assembly 2910 into an electrical signal. According to an embodiment, the image sensor 2930 may include, for example, one image sensor selected from image sensors having the same attributes such as an RGB sensor, a Black and White (BW) sensor, an IR sensor, or a UV sensor, a plurality of image sensors having the same attributes, or a plurality of image sensors having different attributes. Each image sensor included in the image sensor 2930 may be implemented as, for example, a Charged Coupled Device (CCD) sensor or a Complementary Metal Oxide Semiconductor (CMOS) sensor.

The image stabilizer 2940 may move or control (for example, control read-out timing) at last one lens included in the lens assembly 2910 or the image sensor 2930 in a specific direction in order to compensate for at least some of negative effects (for example, image shaking) by movement of the captured image in response to the movement of the camera module 2880 or the electronic device 2801 including the camera module 2880. According to an embodiment, the image stabilizer 2940 may be implemented as, for example, an optical image stabilizer, and the movement may be detected through a gyro sensor (not shown) or an acceleration sensor (not shown) disposed inside or outside the camera module 2880.

The memory 2950 may at least temporarily store at least some of the image acquired through the image sensor 2930 for next image processing. For example, when image acquisition according to a shutter is delayed or a plurality of images are acquired at a high speed, the acquired original image (for example, an image having a high definition) may be stored in the memory 2950, and a duplicate image corresponding thereto (for example, an image having a low definition) may be previewed through the display device 2860. Thereafter, when a predetermined condition is satisfied (for example, a user input or a system command), at least some of the original image stored in the memory 2950 may be acquired and processed by, for example, the image signal processor 2960. According to an embodiment, the memory 2950 may be at least some of the memory 2830 or a separate memory operating independently therefrom.

With respect to the image acquired through the image sensor 2930 or the image stored in the memory 2950, the image signal processor 2960 may perform image processing (for example, depth map creation, 3D modeling, panorama generation, feature point extraction, image synthesis, or image compensation (for example, noise reduction, resolution control, brightness control, blurring, sharpening, or softening). Additionally or alternatively, the image signal processor 2960 may control (for example, control an exposure time or control read-out timing) at least one (for example, the image sensor 2930) of the elements included in the camera module 2880. The image processed by the image signal processor 2960 may be stored again in the memory 2950 for additional processing or transferred to an external element of the camera module 2880 (for example, the memory 2830, the display device 2860, the electronic device 2802, the electronic device 2804, or the server 2808). According to an embodiment, the image signal processor 2960 may be implemented as at least some of the processor 2820 or a separate processor operating independently from the processor 2820. When the processor 2960 is implemented as a separate processor, the images processed by the image signal processor 2960 may be displayed on the display device 2860 without any change or after having additional image processing by the processor 2820.

According to an embodiment, the electronic device 2801 may include two or more camera modules 2880 having different attributes or functions. In this case, for example, at least one camera module 2880 may be a wide-angle camera or a front camera, and at least one other camera module may be a telephoto camera or a rear camera.

Figure 30:
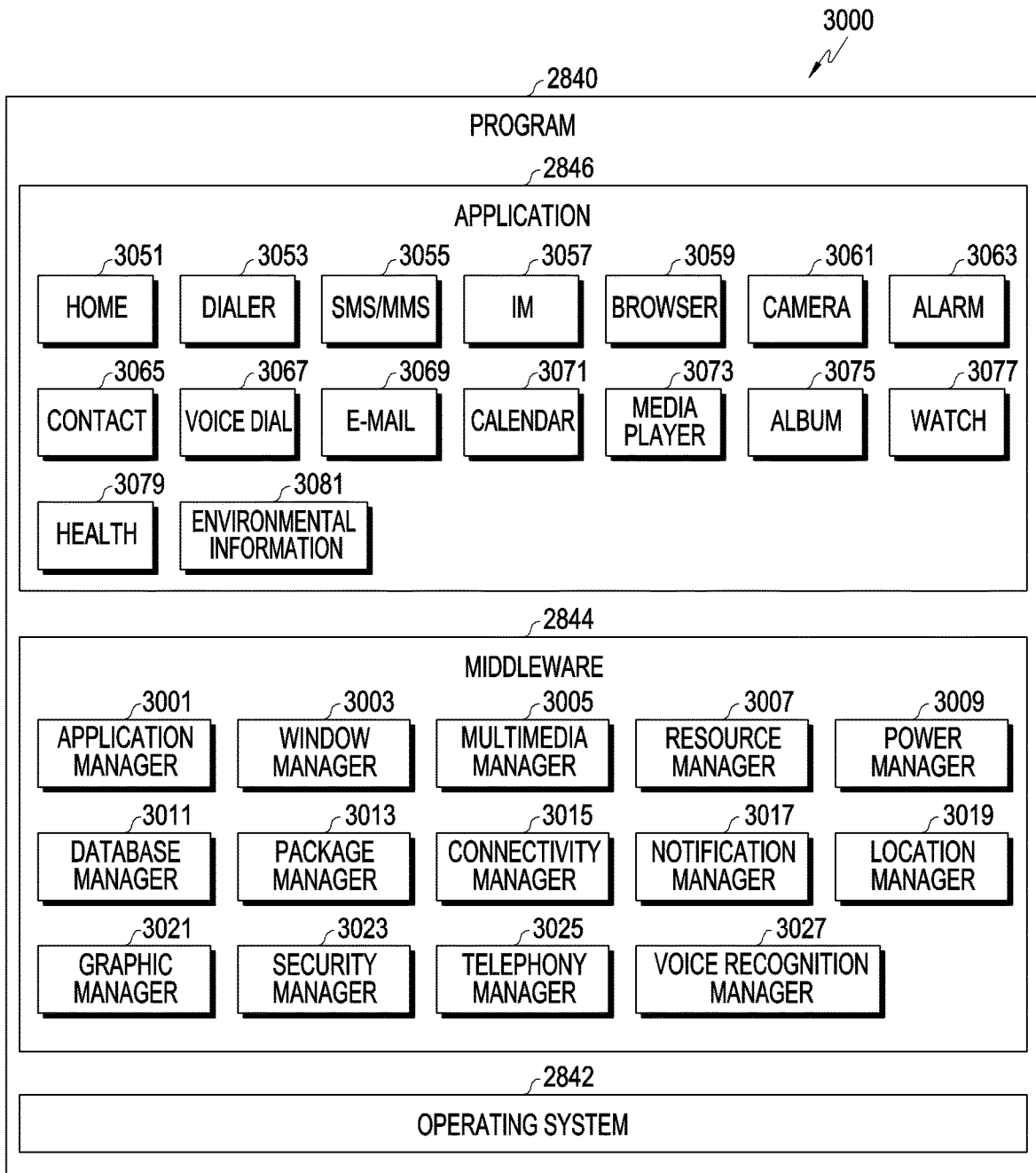
FIG. 30 illustrates a detailed structure of a program module according to an embodiment of the disclosure.

FIG. 30 is a block diagram 3000 of the program 2840 according to various embodiments. According to an embodiment, the program 2840 may include the operating system 2842 for controlling one or more resources of the electronic device 2801, the middleware, or the application 2846 which can be executed on the operating system 2842. The operating system 2842 may include, for example, Android™, iOS™, Windows™, Symbian™, Tizen™, or Bada™. For example, at least some of the program 2840 may be pre-loaded to the electronic device 2801 when manufactured, or downloaded or updated from an external electronic device (for example, the electronic device 2802 or 2804, or the server 2808) in a use environment of the user.

The operating system 2842 may control (for example, allocate or withdraw) system resources (for example, process, memory, or power) of the electronic device 2801. Additionally or alternatively, the operating system 2842 may include one or more driver programs for driving different hardware devices of the electronic device 2801, for example, the input device 2850, the sound output device 2855, the display device 2860, the audio module 2870, the sensor module 2876, the interface 2877, the haptic module 2879, the camera module 2880, the power management module 2888, the battery 2889, the communication module 2890, the subscriber identification module 2896, or the antenna module 2897.

The middleware 2844 may provide various functions to the application 2846 to allow the application 2846 to use functions or information provided from one or more resources of the electronic device 2801. For example, the middleware 2844 may include an application manager 3001, a window manager 3003, a multimedia manager 3005, a resource manager 3007, a power manager 3009, a database manager 3011, a package manager 3013, a connectivity manager 3015, a notification manager 3017, a location manager 3019, a graphic manager 3021, a security manager 3025, a telephony manager 3025, or a voice recognition manager 3027. The application manager 3001 may manage, for example, the life cycles of the applications 226. The window manager 3003 may manage, for example, GUI resources used in the screen. The multimedia manager 3005 may identify formats required for reproducing various media files and may encode or decode a media file using a codec suitable for the corresponding format. The resource manager 3007 may manage, for example, a source code of the application 226 or a memory space. The power manager 3009 may manage, for example, battery capacity, temperature, or power, and determine or provide power information required for the operation of the electronic device 2801 on the basis of the corresponding information. According to an embodiment, the power manager 3009 may operate in conjunction with a Basic Input/Output System (BIOS).

The database manager 3011 may, for example, generate, search, or change databases to be used by the applications 2846. The package manager 3013 may manage installation or update of an application distributed in the form of a packet file. The connectivity manager 3015 may manage, for example, a wireless or wired connection between the electronic device 2801 and an external electronic device. The notification manager 3017 may provide, for example, a function of informing the user of a generated event (for example, a call, a message, or a notification). The location manager 3019 may manage, for example, location information of the electronic device 2801. The graphic manager 3021 may manage a graphic effect to be provided to a user and a user interface relating to the graphic effect. The security manager 3023 may provide, for example, system security or user authentication. The telephony manager 3028 may manage a voice call or image call function of the electronic device 2801. The voice recognition manager 3027 may transmit, for example, voice data of the user to the server 2808 and receive text data converted on the basis of a command corresponding to a function to be performed by the electronic device 2801 on the basis of the corresponding voice data or on the basis of the corresponding voice data. According to an embodiment, the middleware 3044 may dynamically delete some of the conventional elements or add new elements. According to an embodiment, at least some of the middleware 2844 may be included as the part of the operating system 2842 or may be implemented as software separate from the operating system 2842.

The applications 2846 may include, for example, a home application 3051, a dialer application 3053, an SMS/MMS application 3055, an Instant Message (IM) application 3057, a browser application 3059, a camera application 3061, an alarm application 3063, a contacts application 3065, a voice recognition application 3067, an e-mail application 3069, a calendar application 3071, a media player application 3073, an album application 3075, a watch application 3077, a health application 3079 (for example, measuring exercise quantity or blood sugar), or an environment information application 3081 (for example, atmospheric pressure, humidity, temperature information, and the like). According to an embodiment, the application 2846 may further include an information exchange application (not shown) for supporting an information exchange between the electronic device 2801 and an external electronic device. The information exchange application may include a notification relay application for transferring predetermined information (for example, a call, a message, or a notification) to an external electronic device or a device management application for managing an external electronic device. The notification relay application may transfer, for example, notification information corresponding to an event (for example, mail reception) generated by another application (for example, the e-mail application 3069) of the electronic device 2801 to an external electronic device or receive notification information from an external electronic device and provide the notification information to the user of the electronic device 2801. The device management application may control, for example, power (for example, turn on or turn off) or functions (for example, brightness, resolution, or focus of the display device 2860 or the camera module 2880) of an external electronic device communicating with the electronic device 2801 or some elements thereof (for example, the display device 2860 or the camera module 2880). The device management application may additionally or alternatively support installation, deletion, or update of an application executed in an external electronic device.

Each of the constituent elements described in various embodiments of the disclosure may include one or more components, and the names of the corresponding elements may vary depending on the type of electronic device. In various embodiments, the electronic device may include at least one of the constituent elements disclosed herein. Some of the elements may be omitted from or other additional elements may be further included in the electronic device. Also, some of the constituent elements of the electronic device according to various embodiments may be combined into one entity, which may perform functions identical to those of the relevant elements before the combination.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. The "module" may be mechanically or electronically implemented. For example, according to an embodiment, the "module" may be implemented in a form of an application-specific integrated circuit (ASIC). For example, the "module" may include at least one of an application-specific integrated circuit (ASIC) chip, field-programmable gate arrays (FPGAs), and a programmable logic device for performing known operations or operations to be developed in the future.

Devices (e.g., modules or functions thereof) and methods (e.g., operations) according to various embodiments may be implemented as instructions that are stored in the form of a program module in a computer-readable storage medium. The instructions, when executed by a processor (e.g., processor 2820), may cause the processor to perform one or more functions corresponding to the instructions. The computer-readable storage medium may be, for example, a memory (e.g., memory 2860).

The computer-readable storage medium may include a hard disc, a floppy disc, a magnetic medium (e.g., magnetic tape), an optical medium (e.g., compact disc read only memory (CD-ROM), digital versatile disc (DVD)), a magneto-optical medium (e.g., floptical disk), a hardware device (e.g., read only memory (ROM), random access memory (RAM), or flash memory), and the like. The program instructions may include machine language codes generated by a complier or computer-executable codes that can be executed using an interpreter or the like. The hardware device may be configured to operate as one or more software modules for operations according to various embodiments, and vice versa.

According to various embodiments, a module or a program module may include at least one of the above-described elements, exclude some of the elements, or further include additional other elements. According to various embodiments, operations performed by the module, the program module, or any other element may be carried out sequentially, in parallel, repeatedly, or heuristically, or one or more of the operations may be executed in a different order or omitted, or one or more other operations may be added.

According to various embodiments, a storage medium storing instructions is provided. The instructions may be configured to cause at least one processor to cause, when executed by the at least one processor, at least one operation. In a method of generating image data through a plurality of cameras, the at least one operation may include an operation of receiving image data of a first camera selected as a main camera among image data captured by a plurality of cameras through a communication circuit, an operation of transmitting the received image data of the first camera to a real-time broadcasting server through the communication circuit, an operation of determining whether a second camera of the plurality of cameras satisfies a selection condition of a predetermined main camera, and an operation of, when the second camera of the plurality of cameras satisfies the selection condition of the predetermined main camera on the basis of a result of the determination, transmitting image data of the second camera to the real-time broadcasting server through the communication circuit.

Embodiments disclosed in this document are presented for explanation and understanding of the disclosed technology, and do not limit the scope of the technology disclosed in this document. Accordingly, the scope of this document should be construed to include all modifications based on the technical idea of this document or various other embodiments.

What is claimed is:

1. A server comprising:
a communication circuit; and
a processor electrically connected to the communication circuit,
wherein the processor is configured to:
receive image data of a first camera selected as a main camera among image data captured by a plurality of cameras through the communication circuit,
transmit the received image data of the first camera to a real-time broadcasting server through the communication circuit, and
if a second camera of the plurality of cameras satisfies a selection condition of a predetermined main camera, transmit, to the first camera, a first command for switching a state of the first camera to a camera-off state, transmit, to the second camera, a second command for switching a state of the second camera to a camera-on state by selecting the second camera as the main camera, and transmit image data of the second camera to the real-time broadcasting server through the communication circuit, the camera-off state being a state in which capturing is performed but image data transmission to the server is not performed and the camera-on state being a state in which capturing and the image data transmission to the server are both performed, wherein the processor is further configured to:
if a first user interaction corresponding to only a first template is detected through the second camera in a first state that a type of a captured image of the main camera is set to the first template according to a user selection, determine that the second camera satisfies the selection condition of the predetermined main camera,
if a second user interaction corresponding to only a second template is detected through the second camera in a second state that the type of the captured image of the main camera is set to the second template according to the user selection, determine that the second camera satisfies the selection condition of the predetermined main camera, and
if the first user interaction is detected through the second camera in the second state, determine that the second camera does not satisfy the selection condition of the predetermined main camera.

2. The server of claim 1, wherein, if the second camera of the plurality of cameras satisfies the selection condition of the predetermined main camera, the processor is configured to transmit a control signal corresponding to the selection of the main camera to the second camera.

3. The server of claim 1, wherein image data captured by each camera is analyzed and a camera having analyzed image data that satisfies a preset condition is selected as the main camera.

4. The server of claim 3, wherein a direction of a face is recognized in the analyzed image data, and the main camera is selected based on the recognized direction of the face.

5. The server of claim 3, wherein movement of an object is recognized in the analyzed image data, and the main camera is selected based on the recognized movement of the object.

6. The server of claim 1, wherein movement of the camera is recognized, and the main camera is selected based on the recognized movement of the camera.

7. The server of claim 1, wherein the size of a user utterance sound input into a microphone of each camera is determined, and the main camera is selected based on the size of the user utterance sound.

8. The server of claim 1, wherein a distance between an object and each camera is measured, and the main camera is selected based on the measured distance.

9. The server of claim 1, wherein a user gesture is determined by each camera, and the main camera is selected based on the determined user gesture.

10. The server of claim 1, wherein a reference for the selection of the main camera is differently set according to a type of content to be broadcasted.

11. A method of generating image data through a plurality of cameras, the method comprising:
receiving image data of a first camera selected as a main camera among image data captured by a plurality of cameras through a communication circuit;
transmitting the received image data of the first camera to a real-time broadcasting server through the communication circuit;
determining whether a second camera of the plurality of cameras satisfies a selection condition of a predetermined main camera; and
if the second camera of the plurality of cameras satisfies the selection condition of the predetermined main camera, based on a result of the determination, transmitting, to the first camera, a first command for switching a state of the first camera to a camera-off state, transmitting, to the second camera, a second command for switching a state of the second camera to a camera-on state by selecting the second camera as the main camera, and transmitting image data of the second camera to the real-time broadcasting server through the communication circuit, the camera-off state being a state in which capturing is performed but image data transmission to the server is not performed and the camera-on state being a state in which capturing and the image data transmission to the server are both performed, wherein the determining whether the second camera satisfies the selection condition of the predetermined main camera comprises:
if a first user interaction corresponding to only a first template is detected through the second camera in a first state that a type of a captured image of the main camera is set to the first template according to a user selection, determining that the second camera satisfies the selection condition of the predetermined main camera,
if a second user interaction corresponding to only a second template is detected through the second camera in a second state that the type of the captured image of the main camera is set to the second template according to the user selection, determining that the second camera satisfies the selection condition of the predetermined main camera, and
if the first user interaction is detected through the second camera in the second state, determining that the second camera does not satisfy the selection condition of the predetermined main camera.

12. The method of claim 11, further comprising, if the second camera of the plurality of cameras satisfies the selection condition of the predetermined main camera, transmitting a control signal corresponding to the selection of the main camera to the second camera.

13. The method of claim 11, wherein image data captured by each camera is analyzed and a camera having analyzed image data that satisfies a preset condition is selected as the main camera, and the preset condition is configured based on at least some of a recognized direction of a face or movement of an object in the analyzed image data.

14. The method of claim 11, wherein the main camera is selected based on at least some of movement of each camera, the size of a user utterance sound, a measured distance between each camera and an object, and a user gesture determined by each camera.

15. The method of claim 11, further comprising:
receiving a request for inserting additional information or an additional image into the image data;
generating the additional information or the additional image in response to reception of the request; and
inserting the generated additional information or additional image into the image data.

* * * * *